(12) United States Patent
Morotomi et al.

(10) Patent No.: US 7,212,731 B1
(45) Date of Patent: May 1, 2007

(54) RECORDING AND/OR REPRODUCTION APPARATUS AND RECORDING AND/OR REPRODUCTION METHOD

(75) Inventors: Shiro Morotomi, Kanagawa (JP); Tomoyo Kashimoto, Tokyo (JP); Seiji Ohbi, Tokyo (JP)

(73) Assignee: Sony Corporation, Tokyo (JP)

( * ) Notice: Subject to any disclaimer, the term of this patent is extended or adjusted under 35 U.S.C. 154(b) by 1122 days.

(21) Appl. No.: 09/722,165

(22) Filed: Nov. 24, 2000

(30) Foreign Application Priority Data

Nov. 26, 1999 (JP) ................. 11-335821

(51) Int. Cl.
*H04N 5/91* (2006.01)

(52) U.S. Cl. .................. 386/95; 386/107; 386/117

(58) Field of Classification Search ............ 386/46, 386/52, 83, 95; 710/8; 715/716, 760
See application file for complete search history.

(56) References Cited

U.S. PATENT DOCUMENTS

| | | | |
|---|---|---|---|
| 5,559,780 A * | 9/1996 | Maeda et al. ............ 369/53.36 |
| 5,818,439 A * | 10/1998 | Nagasaka et al. ............ 725/87 |
| 5,887,193 A * | 3/1999 | Takahashi et al. ............ 710/8 |
| 6,288,716 B1 * | 9/2001 | Humpleman et al. ....... 715/733 |
| 6,466,233 B1 * | 10/2002 | Mitani ....................... 715/716 |
| 6,678,462 B1 * | 1/2004 | Chihara ....................... 386/83 |
| 6,745,252 B1 * | 6/2004 | Yanagawa et al. ............ 710/8 |
| 6,839,071 B1 * | 1/2005 | Miyamoto .................. 715/788 |

FOREIGN PATENT DOCUMENTS

| | | | |
|---|---|---|---|
| EP | 0716545 A2 * | 6/1996 |
| EP | 0939498 A2 * | 9/1999 |
| EP | 0955635 A1 * | 11/1999 |
| JP | 10-075424 * | 3/1998 |
| JP | 10-187380 A * | 7/1998 |
| JP | 10-269757 A * | 10/1998 |

* cited by examiner

*Primary Examiner*—Huy Nguyen
(74) *Attorney, Agent, or Firm*—Finnegan, Henderson, Farabow, Garrett & Dunner L.L.P.

(57) ABSTRACT

A recording and/or reproduction apparatus for recording and/or reproducing data onto and/or from a storage medium is disclosed. The recording and/or reproduction apparatus includes a recording and/or reproduction section for recording and/or reproducing data onto and/or from the storage medium, a communication section for communicating with an external apparatus, a memory for storing operation screen information corresponding to the recording and/or reproduction section, a transmission controller for controlling the communication section to transmit the operation screen information to the external apparatus, and a controller operable when the communication section receives operation information to the operation screen information displayed on the external apparatus for controlling the recording and/or reproduction section in accordance with the operation information.

25 Claims, 23 Drawing Sheets

FIG. 3

|  | MD-DATA2 | MD-DATA1 |
|---|---|---|
| TRACK PITCH | 0.95 μm | 1.6 μm |
| PIT LENGTH | 0.39 μm/bit | 0.59 μm/bit |
| λ·NA | 650nm·0.52 | 780nm·0.45 |
| RECORDING SYSTEM | LAND RECORDING | GROOVE RECORDING |
| ADDRESS SYSTEM | INTERLACE ADDRESSING (ONE SIDE WOBBLE OF DOUBLE SPIRALS) | OPPOSITE SIDE WOBBLES OF SINGLE SPIRAL |
| MODULATION SYSTEM | RLL(1, 7) | EFM |
| ERROR CORRECTION SYSTEM | RS-PC | ACIRC |
| INTERLEAVE | BLOCK COMPLETED | CONVOLUTION |
| REDUNDANCY | 19.7% | 46.3% |
| LINEAR VELOCITY | 2.0m/s | 1.2m/s |
| DATA RATE | 589kB/s | 133kB/s |
| RECORDING CAPACITY | 650MB | 140MB |

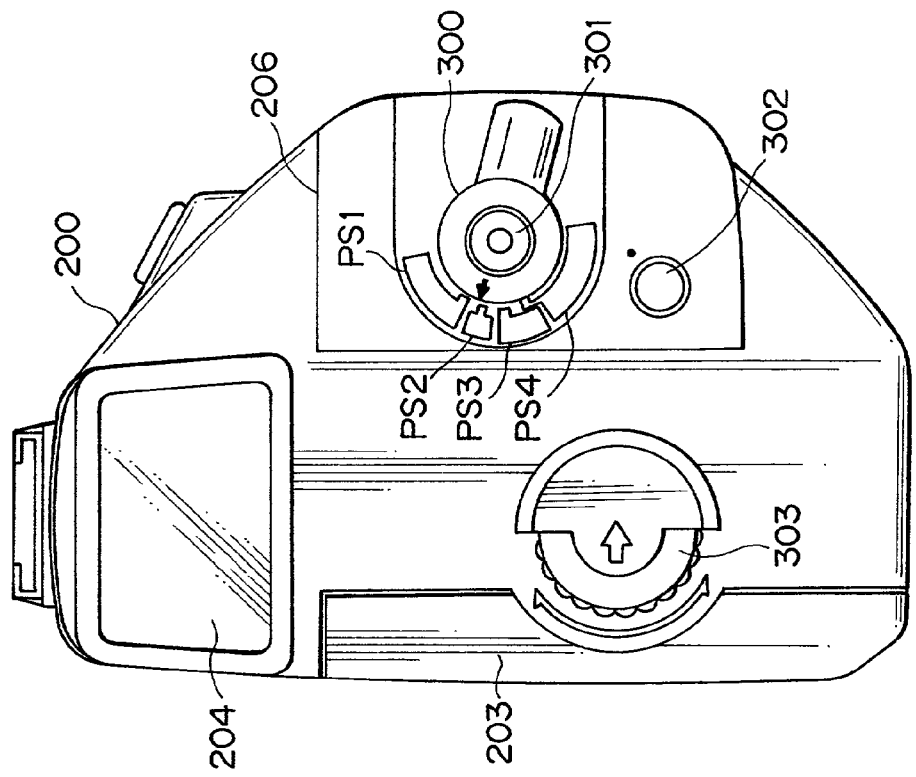
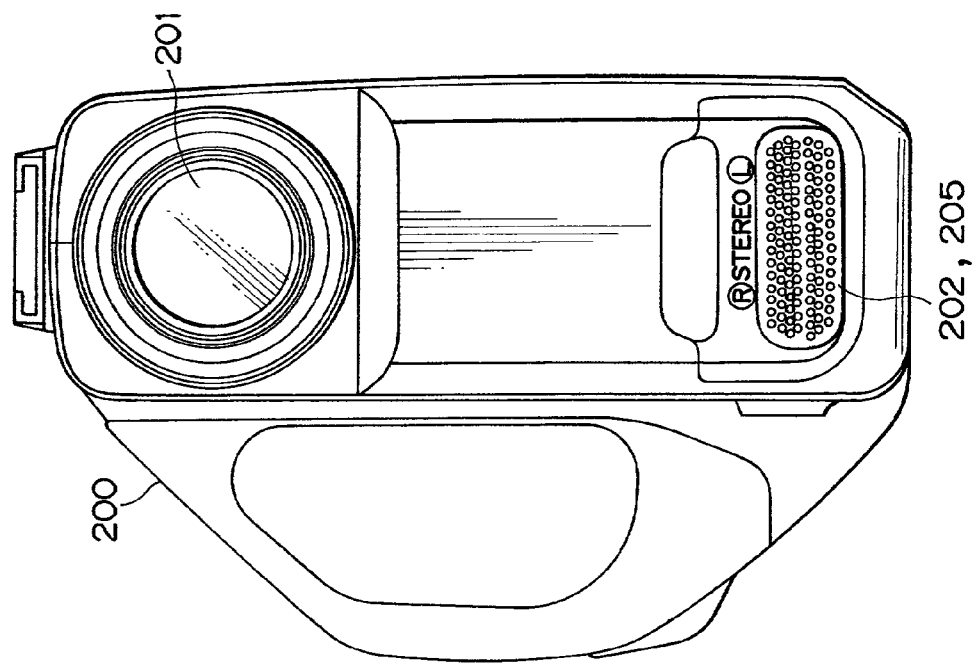

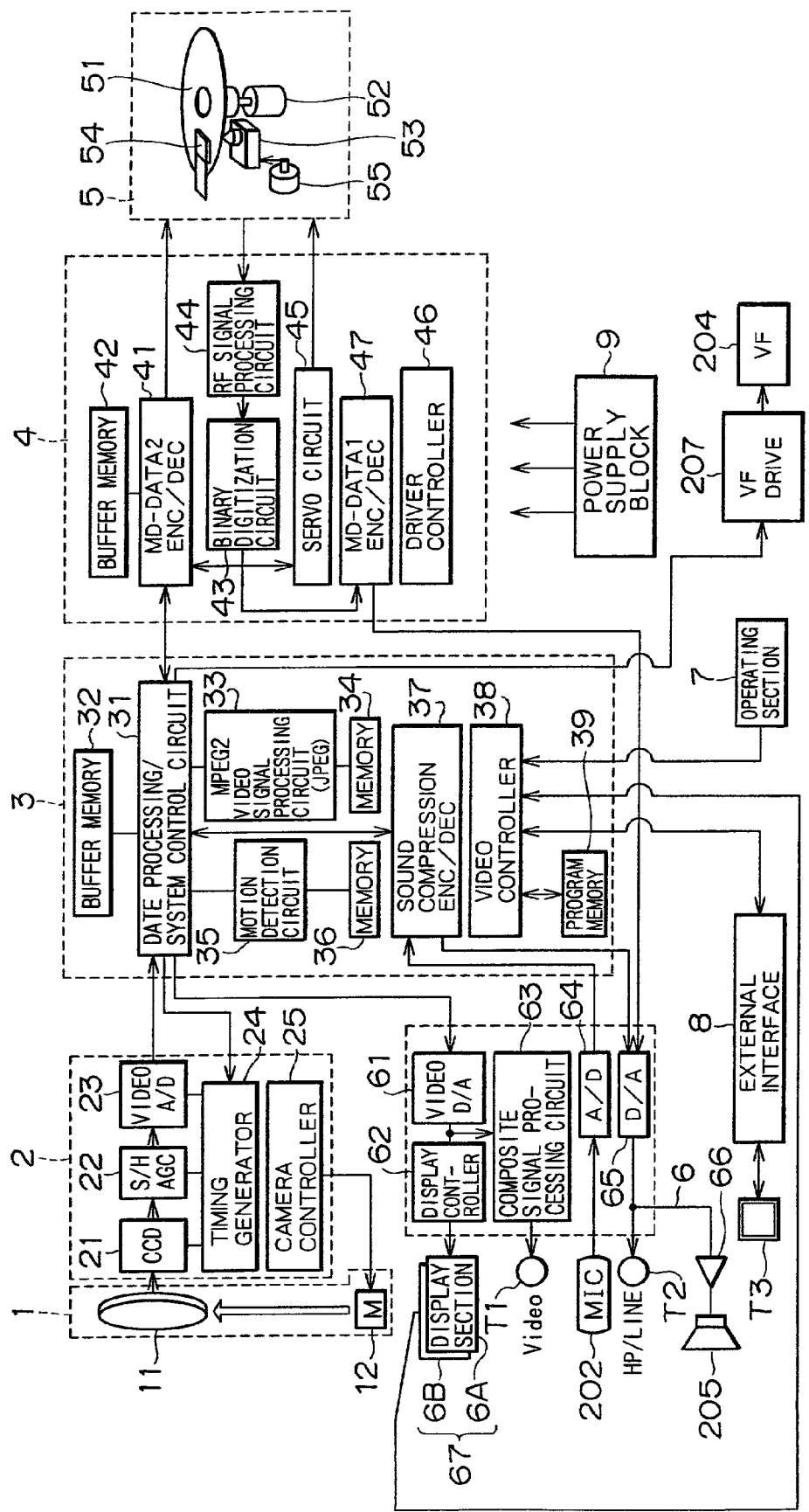

DATA STRUCTURE IN DISK

FIRST POPUP MENU
SECOND POPUP MENU

PC CONNECTION SETTING SCREEN

PC CONNECTION SCREEN

RECORDING AND/OR REPRODUCTION APPARATUS AND RECORDING AND/OR REPRODUCTION METHOD

BACKGROUND OF THE INVENTION

This invention relates to a recording and/or reproduction apparatus and a recording and/or reproduction method for recording and/or reproducing at least image data.

In recent years, digital video cameras have been popularized widely.

One of known digital video cameras has a function of communicating with a personal computer apparatus through a data interface such as an IEEE 1394 interface.

In a system which includes a digital video camera and a personal computer apparatus connected to each other as described above, application software for a digital video camera is installed in the personal computer apparatus. The application software for a video camera allows the personal computer apparatus to fetch image data from the digital video camera side. The personal computer apparatus is further allowed to display and edit the fetched image. Also operation buttons and so forth for operating the video camera are displayed on a screen of the personal computer apparatus provided by the application software for a video camera. A user of the system can operate the displayed operation buttons and so forth to remotely control the digital video camera from the personal computer apparatus side.

In the environment of the system described above, an interface such as an IEEE 1394 interface is adopted. Therefore, a protocol for exclusive use must be used for data transfer in the system. Consequently, the user must prepare application software for exclusive use suitable for the video camera and install the application software into the personal computer apparatus. Further, where different personal computers employ different operating systems (OSs), different types of the application software for exclusive use described above must be prepared for the different operating systems.

Where a data interface such as an IEEE 1394 interface is adopted, the personal computer apparatus side must have a data interface function suitable for the IEEE 1394 as different from an alternative case wherein typically a public network is adopted.

At present, only limited personal computer apparatus have the IEEE 1394 interface function, and it is necessary to provide a personal computer apparatus which does not have the IEEE 1394 interface function typically with an interface board for the IEEE 1394 interface function.

In other words, if a system wherein a digital video camera and a personal computer can communicate with each other is implemented, then it allows more effective utilization of image data recorded by the digital video camera. At present, however, the system described has a problem in that it is poor in universal use from the reason described above and accordingly it is not easy to popularize.

SUMMARY OF THE INVENTION

It is an object of the present invention to provide a system wherein a recording and/or reproduction apparatus and an information processing apparatus such as a personal computer can communicate with each other with an easier and simpler configuration than ever.

In order to attain the object described above, according to an aspect of the present invention, there is provided a recording and/or reproduction apparatus for recording and/or reproducing data onto and/or from a storage medium, including recording and/or reproduction means for recording and/or reproducing data onto and/or from the storage medium, communication means for communicating with an external apparatus, storage means for storing operation screen information corresponding to the recording and/or reproduction means, transmission control means for controlling the communication means to transmit the operation screen information to the external apparatus, and control means operable when the communication means receives operation information to the operation screen information displayed on the external apparatus for controlling the recording and/or reproduction means in accordance with the operation information.

According to another aspect of the present invention, there is provided a recording and/or reproduction apparatus for recording and/or reproducing data onto and/or from a storage medium, including recording and/or reproduction means for recording and/or reproducing data onto and/or from the storage medium, communication means for communicating with an external apparatus, discrimination means operable when transmission request information for requesting for transmission of data is received from the external apparatus through the communication means for discriminating a type of the external apparatus based on the transmission request information, and transmission control means for adaptively changing the format of data read out from the storage medium by the recording and/or reproduction means in response to a result of the discrimination by the discrimination means and controlling the communication means to transmit the data to the external apparatus.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a table illustrating applicable specifications of the disk for use with the video camera;

FIGS. 5A and 5B are a front elevational view and a rear elevational view, respectively, of the video camera;

FIG. 7 is a block diagram showing an internal construction of the video camera;

DESCRIPTION OF THE PREFERRED EMBODIMENT

In the following, an embodiment of the present invention is described.

A recording and reproduction apparatus of the present embodiment described below is incorporated in a portable video camera wherein a camera apparatus section and a recording and reproduction apparatus section which can perform recording and reproduction of an image (a still picture or a moving picture), sound and so forth are integrated with each other. The recording and reproduction apparatus section incorporated in the video camera of the present embodiment adopts a construction wherein data are recorded onto and reproduced from a mini disk (trademark) which is known as a kind of magneto-optical disk.

The description proceeds in the following order.
1. Disk Format
2. Appearance Configuration of the Video Camera
3. Internal Configuration of the Video Camera
4. Configuration of the Medium Drive Section
5. Example of the Disk Structure Ready for the Embodiment
6. Thumbnail Picture Production Process
7. Script
8. Operation Screen Display
9. Data Communication System of the Embodiment
9-1. Example of the System Configuration
9-2. Examples of the System Operation
  9-2-1. PC Connection Setting
  9-2-2 Example (1) of the System Operation
  9-2-3. Example (2) of the System Operation 1. Disk Format The recording and reproduction apparatus section incorporated in the video camera of the present embodiment is ready for a format called MD data in accordance with which data are recorded onto and reproduced from a mini disk (magneto-optical disk). For the MD data format, two different formats called MD-DATA1 and MD-DATA2 have been developed, and the video camera of the present embodiment is used for recording and reproduction of data in accordance with the format of MD-DATA2 which allows higher density recording than MD-DATA1. Therefore, the disk format of MD-DATA2 is described first.

Figure 1:
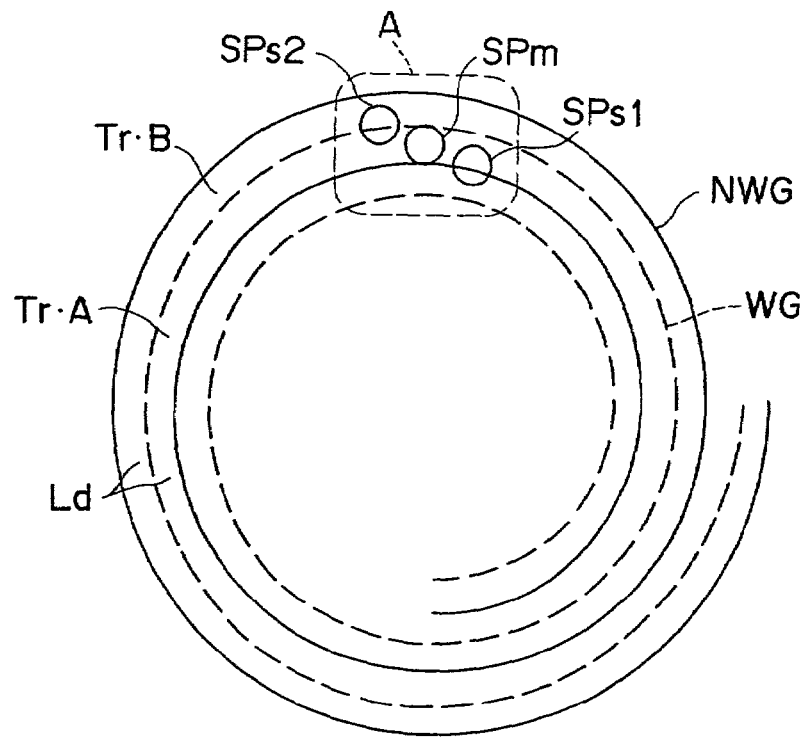
FIG. 1 is a diagrammatic view showing a track structure of a disk for a video camera to which the present invention is applied.
Figures 2A, 2B:
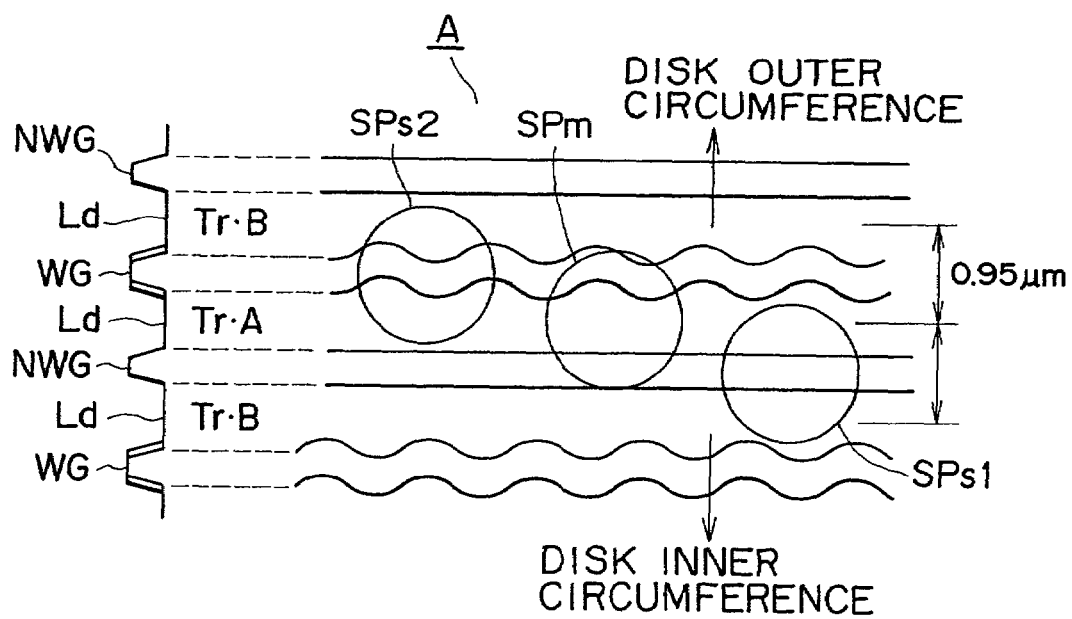
FIGS. 2A and 2B are a schematic cross sectional view and a top plan view, respectively, showing, in an enlarged scale, tracks of the disk shown in FIG. 1.

FIGS. 1, 2A and 2B illustrate a concept of a track structure of a disk in conformity with the MD-DATA2 format, and particularly FIGS. 2A and 2B are a sectional view and a top plan view, respectively, showing a portion surrounded by a broken line A of FIG. 1 in an enlarged scale.

Referring to FIGS. 1, 2A and 2B, two kinds of grooves including a wobbled groove WG to which wobbling is provided and a non-wobbled groove NWG to which no wobbling is provided are formed in advance on a face of the disk. The wobbled groove WG and the non-wobbled groove NWG are formed in the form of double spirals on the disk such that lands Ld are formed between them.

In the MD-DATA2 format, the lands Ld are utilized as recording tracks (tracks on which data are recorded), and since the wobbled groove WG and the non-wobbled groove NWG are formed in such a manner as described above, two tracks Tr•A and Tr•B are formed independently of each other in the form of double spirals as recording tracks.

The wobbled groove WG is positioned on the disk outer circumference side of the track Tr•A, and the non-wobbled groove NWG is positioned on the disk inner circumference side of the track Tr•A.

In contrast, the wobbled groove WG is positioned on the disk inner circumference side of the track Tr•B, and the non-wobbled groove NWG is positioned on the disk outer circumference side of the track Tr•B.

Thus, it can be regarded that, with respect to the track Tr•A, wobbling is formed on only one side, that is, on the disk outer circumference side, but with respect to the track Tr•B, wobbling is formed on only one side, that is, on the disk inner circumference side.

The track pitch is a distance between the centers of portions of the track Tr•A and the track Tr•B which are adjacent each other, and as seen from FIG. 2B, the track pitch is 0.95 µm.

The wobbling formed on the wobbled groove WG is formed in accordance with a signal obtained by encoding physical addresses on the disk by FM modulation and bi-phase modulation. Therefore, upon recording or reproduction, a physical address on the disk can be extracted by demodulation processing of reproduction information obtained from the wobbling provided to the wobbled groove WG.

Further, the address information of the wobbled groove WG is effective commonly to the tracks Tr•A and Tr•B. In other words, the track Tr•A positioned on the inner circumference and the track Tr•B positioned on the outer circumference across the wobbled groove WG commonly have the address information by the wobbling provided to the wobbled groove WG.

Such an addressing system as described above is called interlace addressing system. Adoption of the interlace addressing system allows, for example, reduction of the track pitch while suppressing crosstalk between adjacent wobbles. The system wherein an address is recorded by forming wobbling on a groove is called also ADIP (Address In Pregroove) system.

Identification of which one of the tracks Tr•A and Tr•B, which commonly have the same address information in such a manner as described above, is being traced can be effected in the following manner.

It is a possible idea to apply, for example, a three-beam system such that, in a state wherein a main beam is used for tracing a track provided by a land Ld, the remaining two side beams are used for tracing the grooves positioned on the opposite sides of the track being traced by the main beam.

In FIG. 2B, a state wherein a main beam spot SPm is tracing the track Tr•A is illustrated as a particular example. In the state illustrated, that one of the two side beam spots SPs1 and SPs2 which is on the inner circumference side, that is, the side beam spot SPs1, traces the non-wobbled groove NWG while the other side beam spot SPs2 on the outer circumference side traces the wobbled groove WG.

On the other hand, though not shown, when the main beam spot SPm is tracing the track Tr•B, the side beam spot SPs1 traces the wobbled groove WG while the side beam spot SPs2 traces the non-wobbled groove NWG.

In this manner, the grooves to be traced by the side beam spots SPs1 and SPs2 are inevitably exchanged between the wobbled groove WG and the non-wobbled groove NWG depending upon whether the main beam spot SPm traces the track Tr•A and or the main beam spot SPm traces the track Tr•B.

Detection signals are obtained from photo-detectors by reflection of the side beam spots SPs1 and SPs2 and have waveforms which are different depending upon which one of the wobbled groove WG and the non-wobbled groove NWG is being traced. Therefore, which one of the tracks Tr•A and Tr•B is being traced by the main beam can be identified by discriminating, for example, which one of the side beam spots SPs1 and SPs2 is currently tracing the wobbled groove WG (or the non-wobbled groove NWG).

FIG. 3 illustrates principal specifications of the MD-DATA2 format having such a track structure as described above in comparison with those of the MD-DATA1 format.

First of all, in the MD-DATA1 format, the track pitch is 1.6 µm, and the pit length is 0.59 µm/bit. Further, the laser wavelength λ is λ=780 nm, and the numerical aperture NA of the optical head is NA=0.45.

As a recording system, the groove recording system is used. In other words, a groove is used as a track for recording and reproduction.

As an address system, a system which makes use of a wobbled groove obtained by forming a groove (track) in the form of a single spiral and forming wobbling as address information on the opposite sides of the groove is used.

As a modulation system for recording data, an EFM (8–14 modulation) system is adopted. Further, as an error correction system, the ACIRC (Advanced Cross Interleave Reed-Solomon Code) is adopted, and for data interleaving, that of the convolution type is adopted. Consequently, the redundancy of data is 46.3%.

In the MD-DATA1 format, the CLV (Constant Linear Verocity) is adopted as a disk driving method. The linear velocity of the CLV method is 1.2 m/s.

The standard data rate for recording and reproduction is 133 kB/s, and the recording capacity is 140 MB.

In contrast, in the MD-DATA2 format suitable for the video camera, the track pitch is 0.95 µm and the pit length is 0.39 µm/bit. Consequently, it can be seen that both of them are shorter than those of the MD-DATA1 format. In order to realize the bit length, for example, the laser wavelength λ is set to λ=650 nm and the numerical aperture NA of the optical head is set to NA=0.52 so that the beam spot diameter at the focal position is restricted and the bandwidth of the optical system is increased.

As a recording system, the land recording system is adopted, and as an addressing system, the interlace addressing system is adopted as described above with reference to FIGS. 1, 2A and 2B. As a modulation system for recording data, a RLL(1, 7) system (RLL: Run Length Limited) which is suitable for high density recording is adopted. An RS-PC system is adopted as an error correction system, and block completed type data interleaving is used for the data interleaving. As a result of adoption of the systems described above, it is possible to suppress the redundancy of data down to 19.7%.

Also in the MD-DATA2 format, the CLV (Constant Linear Velocity) method is adopted as a disk driving system. The linear velocity of the CLV method is 2.0 m/s, and the standard data rate upon recording and reproduction is 589 kB/s. As a result, a recording capacity of 650 MB can be obtained. Consequently, higher density recording of four times or more than that by the MD-DATA1 format is realized.

If it is assumed to record a moving picture in accordance with the MD-DATA2 format, then where compression coding in accordance with the MPEG2 is applied to the moving picture data, coded data of moving pictures for 15 to 17 minutes in time can be recorded although this depends upon the bit rate of the coded data. If it is assumed that only audio signal data are recorded, then when compression processing in accordance with the ATRAC (Adaptive Transform Acoustic Coding) 2 system is applied to the audio data, data for approximately 10 hours in time can be recorded.

2. Appearance Construction of the Video Camera

Subsequently, an example of an appearance of the video camera of the present embodiment is described.

Referring to FIGS. 4A, 4B, 5A and 5B, a camera lens 201 including an image pickup lens, an iris and so forth all not shown for picking up an image is provided on a front face of a body 200 of the video camera such that it is exposed outside. A microphone 202 for collecting external sound upon picking up of an image is provided at a lower portion of a rear face of the body 200. Consequently, the video camera can perform recording of an image picked up by the camera lens 201 and recording of stereo sound collected by the microphone 202. The video camera further includes a speaker 205 for outputting reproduction sound. The speaker 205 is located at the same position as the microphone 202. Also required message sound in the form of beep sound or the like can be outputted from the speaker 205.

A viewfinder 204 is provided on the rear face of the body 200. During recording operation, during standby or in a like case, an image, which may be called through picture, fetched from the camera lens 201, a character image or the like is displayed on the viewfinder 204. A user can perform image picking up while watching the viewfinder 204.

A main dial 300, a release key 301 and a delete key 302 which are hereinafter described are provided on a battery lid section 206 of the body 200 which is mounted for opening and closing motion with respect to the remaining portion of the body 200. When the battery lid section 206 is open, a battery or chargeable cell can be loaded into and unloaded from the body 200.

A movable panel section 203 is provided on a side face of the body 200. The movable panel section 203 is supported on a movable support section 208 for movement with respect to the body 200. Movements of the movable panel section 203 are hereinafter described.

A display panel 67, that is, a display screen, is provided on the rear face of the movable panel section 203. Accordingly, when the movable panel section 203 is in an accommodated state as shown in FIG. 4B, the display panel 67 is accommodated in a state directed to the body.

The display panel 67 is a member for displaying or outputting a picked up image, an image reproduced by the internal recording and reproduction apparatus and so forth. Also message displaying or the like by letters, characters and so forth for informing a user of a required message is performed by the display panel 67 in response to an action of the apparatus. It is to be noted that, while the display device to be adopted actually as the display panel 67 is not particularly limited here, for example, a liquid crystal display unit or the like may be used.

The display panel 67 includes a touch panel provided, for example, on the rear face of the display face of a liquid crystal display unit thereof for sensing a depression operation and outputting operation information representing the depression operation. Consequently, the video camera of the present embodiment allows its user to perform a depression operation on an image displayed on the display panel 67, that is, an operation as so-called GUI.

The display panel 67 may be operated by a finger or a like element since it detects a position at which the depressing force is applied to the touch panel as coordinate position information. However, taking it into consideration that there is a limitation to the display area of the display panel 67 and it sometimes is difficult to perform such a pointing operation with a finger, a pen 320 in the form of a stick is provided as shown in of FIG. 4B. The user can use the pen 320 in place of his finger to perform a pointing or touching operation on the display panel 67.

A portion of the body 200 side in which the movable panel section 203 is formed as a disk loading/unloading section 205. A disk as a recording medium for which the video camera of the present example is ready can be inserted into or discharged from the disk loading/unloading section 205.

Though not shown here, actually a video output terminal for outputting a reproduction image signal or a like signal to an external video apparatus, a headphone/line terminal for outputting a reproduction audio signal to an external audio apparatus or headphone, and other necessary terminals are provided on the body 200. Also an I/F terminal and other terminals are provided corresponding to an interface function for performing data transfer to and from an external data apparatus.

Further, various operation elements for user operations are provided at several locations of the body 200. In the following, principal operation elements are described.

The main dial 300 is provided on the rear face of the body 200 in such a manner as shown in FIG. 5B, and serves as an operation element for setting on/off states, a recording operation, or a reproduction operation of the video camera. The main dial 300 allows a rotating operation thereof.

When the main dial 300 is positioned at a power supply off position PS2, the power supply is off. If the main dial 300 is rotationally operated from the position PS2, for example, to a reproduction/editing position PS1, then the power supply is made available and a mode is established wherein reproduction of a recorded picture file and various editing operations can be performed. If the main dial 300 is rotated to the camera mode position PS3, then a camera mode is established wherein the power supply is made available and a recorded picture file of a moving picture or a still picture can be recorded. If the main dial 300 is further rotated to the camera mode position PS4, an interview mode is established.

In the interview mode, although detailed description is omitted here, principally sound is recorded upon recording operation. However, if the release key 301 or a photo key 304 which are hereinafter described is depressed at any time by the user, then an image being picked up at the point of time is recorded as a still picture. Then, in reproduction in the interview mode, a recorded picture file recorded in the interview mode is reproduced. In this instance, the video camera reproduces sound and images recorded in the interview mode in such a manner that, for example, while sound is reproduced, still pictures are switchably displayed successively at timings same as those upon recording.

The release key 301 is provided at the center of the rotatable portion of the main dial 300.

The release key 301 functions as an operation element for starting/ending recording when the video camera is in the camera mode or the interview mode.

A jog dial 303 is provided on the rear face of the body 200. The jog dial 303 is an operation element in the form of a disk and is mounted for rotational operation in the forward/reverse directions while tactile feedback is obtained at each predetermined rotational angle. The jog dial 303 is actually combined, for example, with a two-phase rotary encoder or a like element such that, for example, one click may be equivalent to one rotational step and outputs information of the direction of rotation and the number of rotational steps corresponding to the rotational angle.

The jog dial 311 further allows a depression operation thereof in the leftward direction in FIG. 5B.

The delete key 302 functions as a decision key for deleting data being reproduced in a predetermined mode.

Figure 4A:
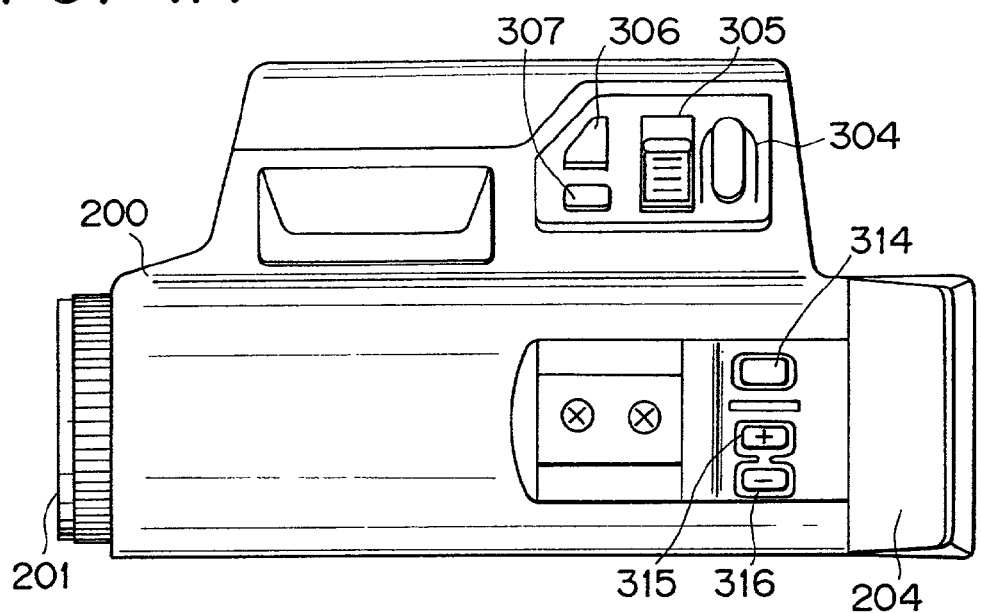
FIGS. 4A and 4B are a top plan view and a side elevational view, respectively, of the video camera.
Figure 4B:
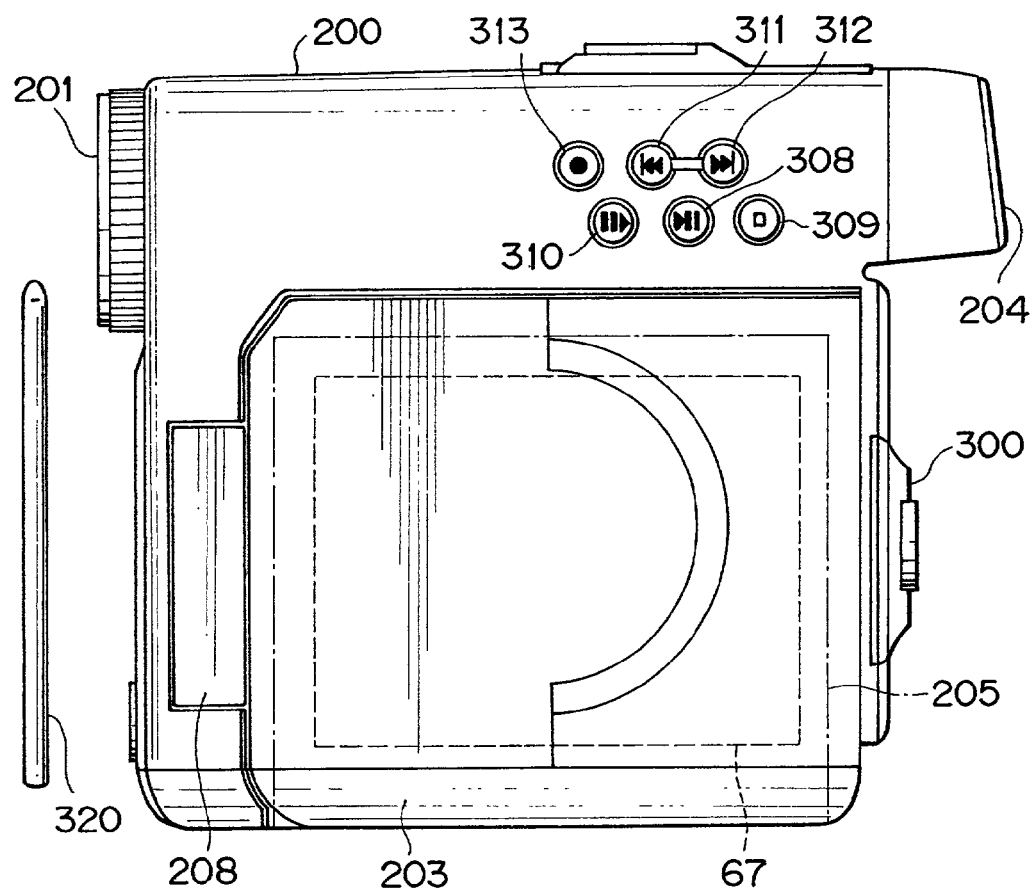

As seen principally in FIG. 4A, the photo key 304, a zoom key 305, a focus key 306 and a backlight correction key 307 are provided in a rather upwardly inclined state on a side face of the body 200.

The photo key 304 is an operation member which functions as a shutter for recording a recorded picture file of a still picture when a depression operation thereof is performed, for example, in the camera mode.

The zoom key 305 is an operation member for operating a zoom state (tele side to wide side) of a lens optical system including the camera lens 201.

The focus key 306 is an operation member for changing over the focus state (for example, normal/infinite or the like) of the lens optical system.

The backlight correction key 307 is an operation member for turning on/off a backlight correction function.

Further, as seen in FIG. 4B, a reproduction/pause key 308, a stop key 309, a slow reproduction key 310, search keys 311 and 312 and a sound recording key 313 as keys relating principally to recording/reproduction of a file (track) are provided on the side face of the body 200 on which the movable panel section 203 is disposed.

Furthermore, as shown in FIG. 4A, a screen display key 314 for displaying a screen and sound volume keys 315 and 316 for adjusting the sound volume of output sound from the speaker are provided on the upper face of the body 200.

It is to be noted that the appearance of the video camera shown in FIGS. 4A, 4B, 5A and 5B is an example at all and may be modified suitably in accordance with conditions of use and so forth required actually for the video camera. Naturally, various elements can be used for the kinds and the operation systems of the operation elements, connection terminals to an external apparatus and so forth.

Here, a manner of movement of the movable panel section 203 described hereinabove is described with reference to FIGS. 6A and 6B. It is to be noted that, in FIGS. 6A and 6B, the appearance of the video camera is shown simplified for the convenience of description.

Figure 6A:
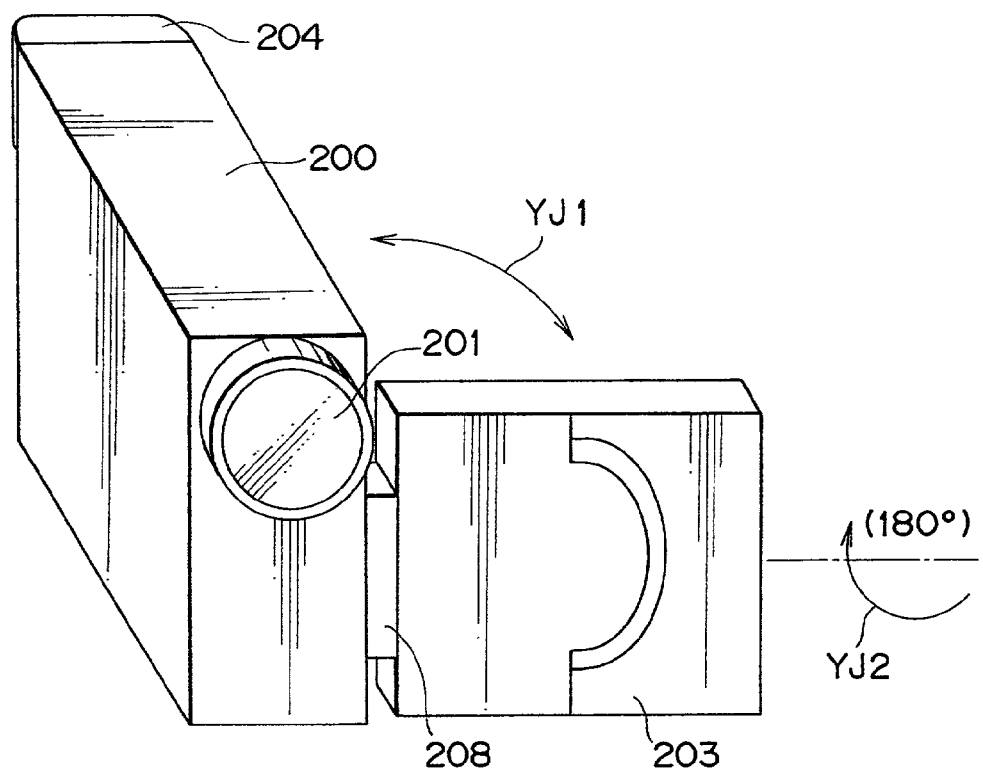
FIG. 6A is a perspective view showing the video camera when a movable panel section thereof is open.

As a possible movement of the movable panel section 203, it can be pulled up first from the position thereof shown in FIG. 4B along a direction of an arrow YJ1 as seen in FIG. 6A to change the position thereof.

In this instance, the display screen, that is, the display panel 67, is moved so as to be directed to the imaging person, that is, to the viewfinder 204, and consequently is directed in substantially reverse to the camera lens 201 which catches an image to be picked up. In the position of the display panel 67 just mentioned, the imaging person who holds the video camera can pick up an image to perform image recording while monitoring a picked up image displayed on the display panel 67.

Further, the movable panel section 203 can be turned in a range of approximate 180° along the direction of an arrow YJ2 from the position shown in FIG. 6A. In other words, the movable panel section 203 can be placed into a position wherein the display panel 67 is directed to the imaging object or camera lens side as seen in FIG. 6B.

When the movable panel section 203 is positioned in this manner, the user who is adjacent the imaging object side with respect to the movable panel section 203 can look at a picked up image.

Figure 6B:
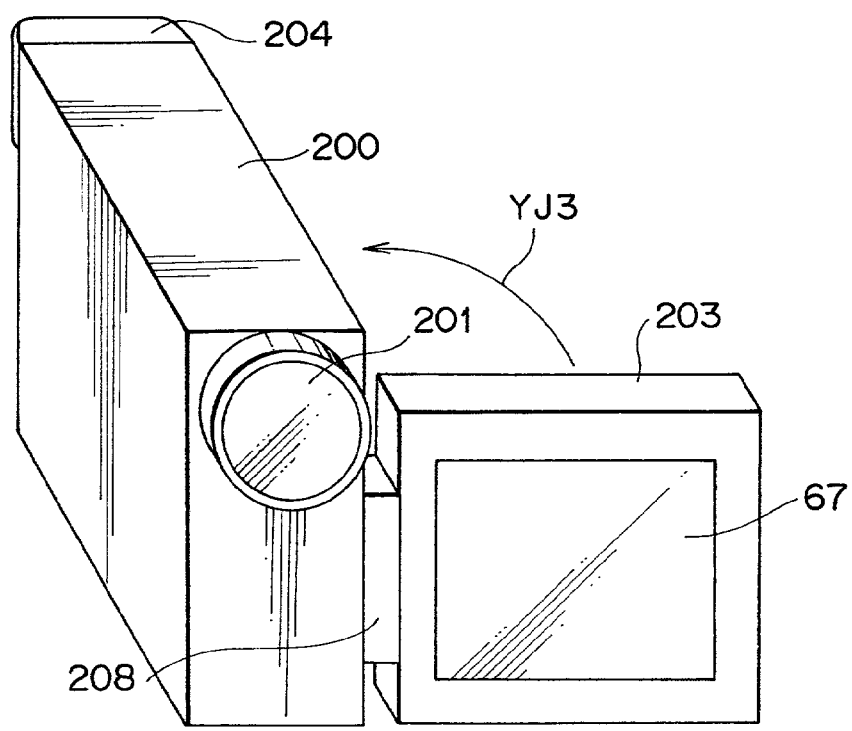
FIG. 6B is a similar view but showing the video camera when the movable panel section is open and a display panel of the movable panel section is directed to an image pickup object.

Insertion or removable a disk into or from the disk loading/unloading section 205 is performed when the movable panel section 203 is in a position in which it is turned out from the body 200 as shown in of FIG. 6A or 6B.

Also it is possible to move the movable panel section 203 in the direction of an arrow YJ3 from the position shown in FIG. 6B. When the movable panel section 203 is positioned in this manner, though not shown, the movable panel section 203 is placed into an accommodated position such that the display panel 67 can be seen from the outside.

It is to be noted that, if the display panel 67 is turned along the direction of the arrow YJ2 in such a manner as described above, then the manner in which the display image looks is reversed in the upward and downward directions and the leftward and rightward directions depending upon whether the display panel 67 is directed to the imaging person side or the display panel 67 is directed to the imaging object side. However, in the video camera of the present embodiment, such a disadvantage as just described is eliminated by performing reverse display control so that the display image of the display panel 67 can be observed normally in an appropriate direction by the user (imaging person and imaging object) in response to the turned state of the movable panel section 203.

3. Internal Configuration of the Video Camera

FIG. 7 shows an example of an internal configuration of the video camera of the present embodiment.

Referring to FIG. 7, a lens block 1 includes an optical system 11 which actually includes an image pickup lens, an iris and so forth. The camera lens 201 described hereinabove with reference to FIG. 4B is included in the optical system 11. A focus motor for driving the optical system 11 to perform an automatic focusing action, a zoom motor for driving a zoom lens to perform a zooming action in response to an operation of the zoom key 304 described above and so forth are provided in a motor section 12 in the lens block 1.

A camera block 2 principally includes a circuit section for converting image light picked up by the lens block 1 into a digital image signal.

An optical image of an imaging object which has passed through the optical system 11 is provided to a CCD (Charge Coupled Device) 21 of the camera block 2. The CCD 21 performs photoelectric conversion of the optical image to produce a picked up image signal and supplies it to a sample hold/AGC (Automatic Gain control) circuit 22. The sample hold/AGC circuit 22 performs gain adjustment for the picked up image signal outputted from the CCD 21 and performs sample hold processing to perform waveform shaping. An output of the sample hold/AGC circuit 2 is supplied to a video A/D converter 23, by which it is converted into image signal data in the form of digital data.

Signal processing timings of the CCD 21, sample hold/AGC circuit 22 and video A/D converter 23 are controlled with timing signals generated by a timing generator 24. The timing generator 24 receives a clock signal used for signal processing by a data processing/system control circuit 31 and generates required timing signals based on the clock signal. The data processing/system control circuit 31 is included in a video signal processing section 3 and is hereinafter described in detail. Signal processing timings of the camera block 2 can be synchronized with processing timings of the video signal processing section 3.

A camera controller 25 executes required control so that the various functioning circuit sections provided in the camera block 2 may operate appropriately. The camera controller further controls automatic focusing, automatic exposure adjustment, diaphragm adjustment, zooming and so forth of the lens block 1.

For example, for the automatic focusing control, the camera controller 25 controls the rotational angle of the focus motor based on focusing control information obtained in accordance with a predetermined automatic focusing control system. Consequently, the image pickup lens is driven so as to establish a just in-focus state.

Upon recording, the video signal processing section 3 compresses a digital image signal supplied thereto from the camera block 2 and a digital audio signal of sound picked up by the microphone 202. The video signal processing section 3 supplies the compression data as user recording data to a medium drive section 4 in the following stage. Further, the video signal processing section 3 produces an image based on the digital image signal supplied thereto from the camera block 2 and a character image and supplies the image to a viewfinder drive section 207 so that it is displayed in the viewfinder 204.

On the other hand, upon reproduction, the video signal processing section 3 demodulates user reproduction data read out from a disk 51 and supplied thereto from the medium drive section 4, in short, image signal data and audio signal data in a compressed form. Then, the video signal processing section 3 outputs results of the demodulation processing as a reproduction image signal and a reproduction sound signal.

It is to be noted that, in the video camera of the present embodiment, for the compression/decompression processing system for image signal data or image data, the MPEG (Moving Picture Experts Group) 2 (trademark) is adopted for a moving picture while the JPEG (Joint Photographic Coding Experts Group: trademark) is adopted for a still picture. On the other hand, for the compression/decompression processing system for audio signal data, the ATRAC (Adaptive Transform Acoustic Coding) 2 is adopted. The compression format of audio data may alternatively be the ATRAC 3 (Adaptive TRansform Acoustic Coding 3: trademark), the MPEG 2 AAC (Advanced Audio Coding: trademark), the QDesign Music Codec (trademark), the TwinVQ (Transform-Domain Weighted Interleave Vector Quantization: trademark), the MS audio (Microsoft Audio (WMA: Windows Media Audio): trademark), or the Ogg Vorbis (trademark).

A data processing/system control circuit 31 of the video signal processing section 3 principally executes control processing regarding compression/decompression of image signal data and sound signal data of the video signal processing section 3 and processing for managing inputting/outputting of data through the video signal processing section 3.

Control processing of the entire video signal processing section 3 including the data processing/system control circuit 31 is executed by a video controller 38 which includes, for example, a microcomputer and so forth. The video controller 38 can communicate with the camera controller 25 of the camera block 2 and a driver controller 46 of the medium drive section 4, which is hereinafter described, over, for example, a bus line and so forth not shown. Thus, the video controller 38 functions as a master controller which controls the entire system.

A program memory 39 is provided for the video controller 38.

The program memory 39 may be formed from a reloadable storage element such as, for example, an EEPROM or a flash memory. Various programs to be executed by the video controller 38 serving as a master controller and information such as various setting data are stored in the program memory 39.

As basic action of the video signal processing section 3 upon recording, image signal data supplied from the video A/D converter 23 of the camera block 2 are inputted to the data processing/system control circuit 31. The data processing/system control circuit 31 supplies the inputted image signal data, for example, to a motion detection circuit 35. The motion detection circuit 35 utilizes, for example, a memory 36 as a working area to perform image processing such as motion compensation for the inputted image signal data and supplies resulting data to an MPEG2 video signal processing circuit 33.

The MPEG2 video signal processing circuit 33 utilizes, for example, a memory 34 as a working area to compress the inputted image signal data in accordance with the format of the MPEG2 and outputs a bit stream (MPEG2 bit stream) of compression data as a moving picture. The MPEG2 video signal processing circuit 33 is constructed such that, for example, when it extracts image data of a still picture from image signal data of a moving picture and performs compression processing for the image data as a still picture, it produces compression image data as a still picture in accordance with the format of the JPEG. However, it is otherwise possible not to adopt the JPEG but to handle an I picture (Intra Picture), which is normal image data as compression image data according to the format of the MPEG2, as image data of a still picture.

The image signal data or compression image data compressed and coded by the MPEG2 video signal processing circuit 33 are written at a predetermined transfer rate into and temporarily stored in, for example, a buffer memory 32.

It is to be noted that the format of the MPEG2 supports both of a constant rate (CBR: Constant Bit Rate) and a variable rate (VBR: Variable Bit Rate) as the coding bit rate or data rate as well known in the art. The video signal processing section 3 is ready for both data rates.

When a VBR is used to perform image compression, the motion detection circuit 35 typically performs motion detection within the range of preceding and following several tens to several hundreds frames in a unit of a macro block. If it is detected that motion is present, then the motion detection circuit 35 supplies this result of detection as motion vector information to the MPEG2 video signal processing circuit 33.

The MPEG2 video signal processing circuit 33 makes use of required information including the motion vector information to decide a quantization coefficient for each macro block so that image data after compression coding may have a required data rate.

A sound compression encoder/decoder 37 receives, for example, sound picked up by the microphone 202 as sound signal data in the form of digital data through an A/D converter 64 provided in a display/image/sound input/output unit 6.

The sound compression encoder/decoder 37 compresses the sound signal data inputted thereto in accordance with the format of the ATRAC2 as described above. Also the compression sound signal data are written at a predetermined transfer rate to the buffer memory 32 by the data processing/system control circuit 31 and temporarily stored in the buffer memory 32.

Compression image data and compression sound signal data can be stored into the buffer memory 32 in such a manner as described above. The buffer memory 32 has a function principally for absorbing a rate difference between the data transfer rate between the camera block 2 or the display/image/sound input/output unit 6 and the buffer memory 32 and the data transfer rate between the buffer memory 32 and the medium drive section 4.

The compression image data and the compression sound signal data stored in the buffer memory 32 are read out successively at predetermined timings and transmitted to an MD-DATA2 encoder/decoder 41 of the medium drive section 4. However, for example, upon reproduction, actions for reading out data stored in the buffer memory 32 and recording the read out data onto the disk 51 from the medium drive section 4 through a deck unit 5 may be performed intermittently.

Such writing and reading out control of data into and from the buffer memory 32 is executed typically by the data processing/system control circuit 31.

Operation of the video signal processing section 3 upon reproduction is generally such as described below.

Upon reproduction, compression image data and compression sound signal data are read out from the disk 51 and decoded in accordance with the MD-DATA2 format by the MD-DATA2 encoder/decoder 41 provided in the medium drive section 4). The compression image data and compression sound signal data are transferred as user reproduction data to the data processing/system control circuit 31.

The data processing/system control circuit 31 stores the compression image data and the compression sound signal data inputted thereto typically into the buffer memory 32 once. Then, the data processing/system control circuit 31 reads out the compression image data and the compression sound signal data from the buffer memory 32 at a required timing and at a required transfer rate with which matching of reproduction time bases is obtained. The compression image data are supplied to the MPEG2 video signal processing circuit 33 while the compression sound signal data are supplied to the sound compression encoder/decoder 37.

The MPEG2 video signal processing circuit 33 decompresses the compression image data inputted thereto and transmits the decompressed image data to the data processing/system control circuit 31. The data processing/system control circuit 31 supplies the decompression image signal data to a video D/A converter 61 provided in the display/image/sound input/output unit 6.

Meanwhile, the sound compression encoder/decoder 37 decompresses the compression audio signal data inputted thereto and supplies the decompressed audio signal data to a D/A converter 65 provided in the display/image/sound input/output unit 6.

In the display/image/sound input/output unit 6, the image signal data inputted to the video D/A converter 61 are converted into an analog image signal by the video D/A converter 61. The analog image signal is inputted to a display controller 62 and a composite signal processing circuit 63.

The display controller 62 drives a display unit 6A in accordance with the image signal inputted thereto. Consequently, a reproduction image is displayed on the display unit 6A. The display unit 6A not only can display an image reproduced from the disk 51 but also can naturally display and output also a picked up image from the camera section formed from the lens block 1 and the camera block 2 substantially on the real time basis.

The display unit 6A displays not only such a reproduction image and a picked up image as described above but also a message typically in the form of a string of characters to be conveyed to a user in response to an action of the apparatus as described hereinabove. In order to realize the message display operation, typically the video controller 38 controls the data processing/system control circuit 31 so as to synthesize image signal data of characters and so forth with image signal data to be outputted from the data processing/system control circuit 31 to the video D/A converter 61.

A touch panel 6B is combined with the display unit 6A to form a display panel 67. The touch panel 6B detects position information of the display unit 6A at which the display unit is depressed and outputs the detected position information as operation information to the video controller 38.

The composite signal processing circuit 63 converts the analog image signal supplied thereto from the video D/A converter 61 into a composite signal and outputs the composite signal to a video output terminal T1. Where the video camera is connected to an external monitor apparatus through the video output terminal T1, an image reproduced by the video camera can be displayed on the external monitor apparatus.

In the display/image/sound input/output unit 6, the sound signal data inputted thereto from the sound compression encoder/decoder 37 to the D/A converter 65 are converted into an analog sound signal by the D/A converter 65. The analog audio signal is outputted to a headphone/line terminal T2. The analog audio signal outputted from the D/A converter 65 is outputted also to the speaker 205 through an amplifier 66. Consequently, reproduction sound or the like is outputted from the speaker 205.

The medium drive section 4 principally encodes, upon recording, recording data in accordance with the MD-DATA2 format so as to conform with recording onto a disk and transmits the encoded data to the deck unit 5. However, upon reproduction, the medium drive section 4 decodes data read out from the disk 51 by the deck unit 5 to obtain reproduction data and transmits the reproduction data to the video signal processing section 3.

The MD-DATA2 encoder/decoder 41 of the medium drive section 4 receives, upon recording, recording data (compression image data+compression sound signal data) from the data processing/system control circuit 31, performs predetermined encoding processing for the recording data in accordance with the MD-DATA2 format, and temporarily stores the encoded data into a buffer memory 42. Then, the MD-DATA2 encoder/decoder 41 performs reading out at a required timing and transmits the read out data to the deck unit 5.

Upon reproduction, the MD-DATA2 encoder/decoder 41 decodes a digital reproduction signal read out from the disk 51 inputted thereto through a RF signal processing circuit 44 and a binary digitization circuit 43 in accordance with the MD-DATA2 format. The MD-DATA2 encoder/decoder 41 transmits the decoded digital reproduction signal as reproduction data to the data processing/system control circuit 31 of the video signal processing section 3.

It is to be noted that, also in this instance, if necessary, the MD-DATA2 encoder/decoder 41 stores the reproduction data once into the buffer memory 42 and read out the data at a required timing from the buffer memory 42. The read out data are transmitted and outputted to the data processing/system control circuit 31. Such writing/reading out control into/from the buffer memory 42 is executed by the driver controller 46.

It is to be noted that, even if serving upon reproduction of the disk 51 is lost by a disturbance or the like to disable reading out a signal from the disk, if a reproduction operation from the disk is restored within a period in which read out data remain stored in the buffer memory 42, then continuity in time series of reproduction data can be maintained.

The RF signal processing circuit 44 performs required processing for a signal read out from the disk 51 to form, for example, a RF signal as reproduction data and servo control signals such as a focusing error signal and a tracking error signal for servo control of the deck unit 5. The RF signal is binary digitized by the binary digitization circuit 43 as described hereinabove and inputted as digital signal data to the MD-DATA2 encoder/decoder 41.

The various servo control signals produced in this manner are supplied to a servo circuit 45. The servo circuit 45 executes required servo control of the deck unit 5 in accordance with the servo control signals inputted thereto.

It is to be noted that the video camera of the present embodiment includes an encoder/decoder 47 ready for the MD-DATA1 format. Consequently, recording data supplied from the video signal processing section 3 can be encoded in accordance with the MD-DATA1 format and recorded onto the disk 51. Further, data encoded in accordance with the MD-DATA1 and read out from the disk 51 can be decoded and then transmitted and outputted to the video signal processing section 3. Thus, the video camera of the present embodiment is constructed to provide the compatibility between the MD-DATA2 format and the MD-DATA1 format.

The driver controller 46 is a functioning circuit unit for controlling the medium drive section 4 as a whole.

The deck unit 5 is a member having a function to drive the disk 51. Though not shown, the deck unit 5 has a mechanism for loading and unloading a disk 51 into and from the deck unit 5, that is, a disk slot not shown of the movable panel section 203 (refer to FIG. 6B). The mechanism described allows replacement of a disk by working of a user. Here, it is presupposed that the disk 51 is a magneto-optical disk ready for the MD-DATA2 format or the MD-DATA1 format.

In the deck unit 5, the disk 51 loaded is driven to rotate at a CLV by a spindle motor 52 which drives to rotate the disk 51 at a CLV. Upon recording/reproduction, laser light is irradiated from an optical head 53 upon the disk 51.

Upon recording, the optical head 53 outputs a laser beam of a high level for heating a recording track to its Curie point, but outputs, upon reproduction, a laser beam of a comparatively low level for detecting data from reflected light by a magnetic Kerr effect. To this end, although detailed description is omitted here, a laser diode serving as laser outputting means, an optical system including a polarizing beam splitter, an objective lens and so forth and a detector for detecting reflected light are incorporated in the optical head 53. The objective lens provided on the optical head 53 is held for displacement in a radial direction of the disk 51 and a direction toward and away from the disk 51 typically by a biaxial mechanism.

A magnetic head 54 is disposed at a position opposing to the optical head 53 across the disk 51. The magnetic head 54 performs an action of applying a magnetic field modulated with data to be recorded onto the disk 51.

Further, though not shown, the deck unit 5 includes a sled mechanism which is driven by a sled motor 55. When the sled mechanism is driven, the entire optical head 53 and the magnetic head 54 can be moved in a disk radial direction.

An operation unit 7 corresponds to the various operation elements shown in FIGS. 4A and 4B, and information of various operations of the operation elements by a user is outputted typically to the video controller 38.

The video controller 38 supplies control information for causing necessary actions corresponding to operation information outputted from the touch panel 6B described hereinabove and the operation unit 7 to be executed by the pertaining sections to the camera controller 25 and the driver controller 46.

An external interface 8 allows mutual transmission of data between the video camera and an external apparatus. The external interface 8 is provided typically between an I/F terminal T3 and the video signal processing section as shown in FIG. 7.

In the video camera of the present embodiment, an ethernet utilized widely by a LAN (Local Area Network) is adopted for the external interface 8. As well known in the art, the ethernet includes a single transmission line and accordingly is simple in structure and low in cost. Therefore, the ethernet is suitable for construction of a LAN and so forth. Where the external interface 8 is ready for the ethernet, the IP (Internet Protocol) is adopted as a communication protocol.

The I/F terminal T3 has a terminal configuration compliant with a connector of a cable which complies with the ethernet.

If the video camera of the present embodiment is connected to a transmission line of an ethernet through the I/F terminal T3, then it is possible for the video camera to communicate with a personal computer apparatus or some other digital image video apparatus connected to the transmission line to transmit or receive video and/or audio data and so forth. Also it is possible to remotely control the video camera of the present embodiment from another apparatus connected by an ethernet.

Although detailed description is omitted here, where the video camera of the present embodiment is connected to a personal computer apparatus by a transmission line of an ethernet and outputs and transmits, for example, thumbnail picture data for thumbnail picture display, it can output a thumbnail display picture produced as a web file of the HTML format. To this end, also a set (program) for producing data as a web file of the HTML format is stored typically in the program memory 39.

It is to be noted that the interface in the video camera of the present embodiment for allowing transmission and reception of data to and from an external apparatus need not be such an ethernet as described above and may include, for example, an IEEE 1394 interface in place of or in addition to the ethernet. In other words, the external interface 8 shown in FIG. 7 may include a plural number of interface sections having different specifications corresponding to the number of interface functions to be provided actually for the video camera.

A power supply block 9 makes use of dc power supply obtained from a battery built in the video camera or dc power supply produced from commercial ac power supply to supply power supply voltages of required levels to various functioning circuit sections. On/off of power supply by the power supply block 9 is controlled by a video controller 38 in response to an operation of the main dial 300 described hereinabove.

During recording action, the video controller 38 controls an indicator 206 to execute a light emitting operation.

4. Configuration of the Medium Drive Section

Figure 8:
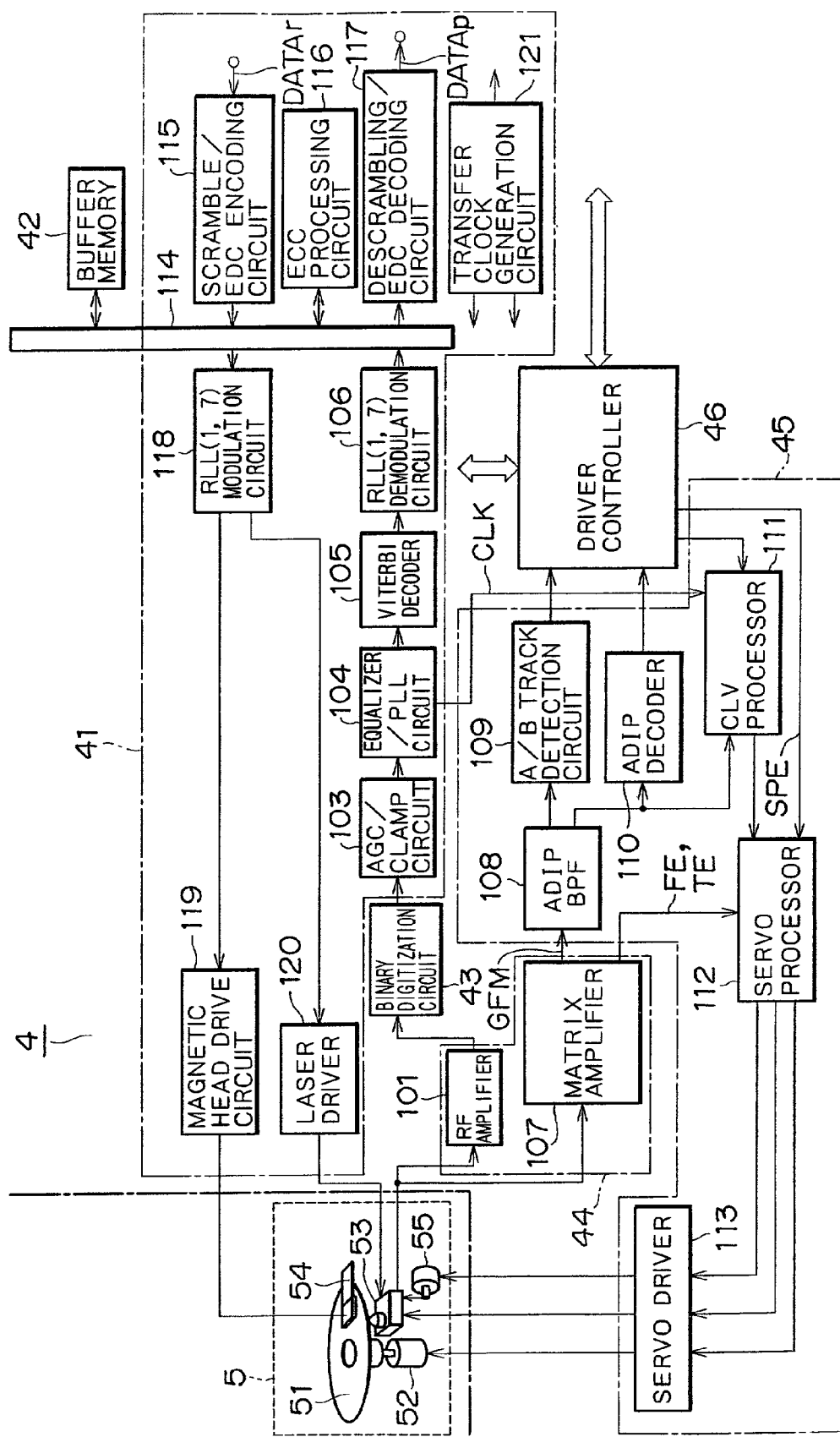
FIG. 8 is a block diagram of an internal construction of a media drive unit of the video camera.

Now, those functioning circuit sections of the medium drive section 4 shown in FIG. 7 which correspond to the MD-DATA2 are described with reference to a block diagram of FIG. 8. It is to be noted that, while FIG. 8 shows the deck unit 5 with the medium drive section 4, since the internal configuration of the deck unit 5 is described above with reference to FIG. 7, overlapping description of the same is omitted here to avoid redundancy.

Information detected by a data reading out action of the optical head 53 from the disk 51 is supplied to a RF amplifier 101 in the RF signal processing circuit 44. The information in this instance is photoelectric current obtained by means of the photodetector as a result of detection of reflected light of a laser beam.

The RF amplifier 101 produces a reproduction RF signal as a reproduction signal from the detection information inputted thereto and supplies the reproduction RF signal to the binary digitization circuit 43. The binary digitization circuit 43 performs binary digitization of the reproduction RF signal inputted thereto to obtain a reproduction RF signal or binary digitized RF signal in the form of a digital signal.

The binary digitized RF signal is supplied to the MD-DATA2 encoder/decoder 41, in which gain adjustment, clamping processing and so forth are performed for the binary digitized RF signal by an AGC/clamp circuit 103 and a resulting signal is inputted to an equalizer/PLL circuit 104.

The equalizer/PLL circuit 104 equalizes the binary digitized RF signal inputted thereto and outputs the equalized binary digitized RF signal to a Viterbi decoder 105. The binary digitized RF signal after equalized is inputted to a PLL circuit to extract a clock signal CLK synchronized with the binary digitized RF signal in the form of a RLL (1, 7) code train.

The frequency of the clock signal CLK corresponds to the rotational speed of the disk at present. Therefore, a CLV processor 111 receives the clock signal CLK from the equalizer/PLL circuit 104 and compares the clock signal CLK with a reference value corresponding to a predetermined CLV velocity (refer to FIG. 3) to obtain error information, and utilizes the error information as a signal component for producing a spindle error signal SPE. The clock signal CLK is used also as a clock signal for processing of required signal processing circuit systems including a RLL (1, 7) demodulation circuit 106.

The Viterbi decoder 105 decodes the binary digitized RF signal inputted thereto from the equalizer/PLL circuit 104 in accordance with a Viterbi decoding scheme. Consequently, the video decoder 105 outputs reproduction data in the form of a RLL (1, 7) code train.

The reproduction data are inputted to the RLL (1, 7) demodulation circuit 106, by which they are converted into a RLL (1, 7) demodulated data stream.

The data stream obtained by the demodulation processing of the RLL (1, 7) demodulation circuit 106 is written into the buffer memory 42 over a data bus 114 and expanded on the buffer memory 42.

The data stream expanded on the buffer memory 42 in this manner is first subject to error correction processing in a unit of an error correction block in accordance with the RS-PC system by an ECC processing circuit 116 and then to descramble processing and EDC decoding processing (error detection processing) by a descrambling/EDC decoding circuit 117.

The data obtained by the processing till then are referred to as reproduction data DATAp. The reproduction data DATAp are transferred at a transfer rate in accordance with a transfer clock signal generated by a transfer clock generation circuit 121 typically from the descrambling/EDC decoding circuit 117 to the data processing/system control circuit 31 of the video signal processing section 3.

The transfer clock generation circuit 121 is a member which suitably generates a transfer clock signal (data transfer rate), for example, from a clock signal of a crystal system. The transfer clock signal has an appropriate frequency for data transfer between the medium drive section 4 and the deck unit 5 or for data transfer between functioning circuit sections in the medium drive section 4.

The transfer clock generation circuit 121 further generates a clock signal of a required frequency to be supplied to various functioning circuit sections of the medium drive section 4 and the video signal processing section 3 in response to an operation state of the video camera.

The detection information in the form of photoelectric current read out from the disk 51 by the optical head 53 is supplied also to a matrix amplifier 107.

The matrix amplifier 107 performs required arithmetic operation processing for the detection information inputted thereto to extract a tracking error signal TE, a focusing error signal FE, groove information (absolute address information recorded as the wobbled groove WG on the disk 51) and so forth. The matrix amplifier 107 supplies the extracted information to the servo circuit 45. More particularly, the tracking error signal TE and the focusing error signal FE are supplied to a servo processor 112, and the groove information GFM is supplied to an ADIP band-pass filter 108.

The groove information GFM is subject to band limitation by the ADIP band-pass filter 108 and then supplied to an A/B track detection circuit 109, an ADIP decoder 110 and a CLV processor 111.

The A/B track detection circuit 109 identifies, for example, in accordance with the scheme described with reference to FIG. 2B, from the groove information GFM inputted thereto, which one of the tracks TR•A and TR•B is being currently traced. The A/B track detection circuit 109 outputs resulting track identification information to the driver controller 46. The ADIP decoder 110 decodes the groove information GFM inputted thereto to extract an ADIP signal which represents absolute address information on the disk 51, and outputs the ADIP signal to the driver controller 46. The driver controller 46 receives the track identification information and the ADIP signal and executes required control processing based on them.

The CLV processor 111 receives the clock signal CLK from the equalizer/PLL circuit 104 and receives the groove information GFM through the ADIP band-pass filter 108. The CLV processor 111 integrates a phase error between the groove information GFM and the clock signal CLK to obtain an error signal and produces a spindle error signal SPE for CLV servo control based on the error signal. The spindle error signal SPE is outputted to the servo processor 112. It is to be noted that required action to be executed by the CLV processor 111 is controlled by the driver controller 46.

The servo processor 112 receives the tracking error signal TE, focusing error signal FE and spindle error signal SPE inputted thereto in such a manner as described above and a track jump instruction, an access instruction or the like from the driver controller 46. The servo processor 112 produces various servo control signals including a tracking control signal, a focusing control signal, a sled control signal, a spindle control signal and so forth based on the received signals and instruction, and outputs the servo control signals to a servo driver 113.

The servo driver 113 produces required servo drive signals based on the servo control signals supplied thereto from the servo processor 112. The servo drive signals include biaxial drive signals, that is, two signals for a focusing direction and a tracking direction, for driving the biaxial mechanism, a sled motor drive signal for driving the sled mechanism and a spindle motor drive signal for driving the spindle motor 52.

The servo drive signals are supplied to and used by the deck unit 5 to perform focusing control and tracking control for the disk 51 and CLV control for the spindle motor 52.

When a recording operation onto the disk 51 is to be executed in the video camera, user recording data DATAr to be recorded are inputted from the data processing/system control circuit 31 of the video signal processing section 3 to a scramble/EDC encoding circuit 115. The user recording data DATAr are inputted, for example, in synchronism with a transfer clock signal of the data transfer rate generated by the transfer clock generation circuit 121.

The scramble/EDC encoding circuit 115 writes and expands the recording data DATAr into and on the buffer memory 42 to perform data scramble processing and EDC encoding processing, which is processing of adding an error detection code in accordance with a predetermined system, for the recording data DATAr. Thereafter, the ECC processing circuit 116 adds, for example, error correction codes conforming to the RS-PC system to the recording data DATAr expanded on the buffer memory 42.

The recording data DATAr to which such processing as described above has been performed are read out from the buffer memory 42 and supplied to a RLL (1, 7) modulation circuit 118 over the data bus 114.

The RLL (1, 7) modulation circuit 118 performs RLL(1, 7) modulation for the recording data DATAr inputted thereto and outputs resulting data in the form of a RLL (1, 7) code train to a magnetic head drive circuit 119.

By the way, the MD-DATA2 format adopts a laser strobe magnetic field modulation system as a recording system for a disk. The laser strobe magnetic field modulation system is a recording system wherein a magnetic field modulated with recording data is applied to a recording face of a disk and a laser beam to be irradiated upon the disk is emitted in the form of pulses in synchronism with the recording data.

In the laser strobe magnetic field modulation system just described, the process of formation of pit edges recorded on the disk does not rely upon a transition characteristic of a speed of reversal of the magnetic field or the like, but depends upon an irradiation timing of a laser pulse.

Therefore, with the laser strobe magnetic field modulation system, jitters of recording pits can be reduced to a very low level when compared with a simple magnetic field modulation system wherein a laser beam is irradiated constantly upon a disk and a magnetic field modulated with recording data is applied to a recording face of the disk. In short, the laser strobe magnetic field modulation system is a recording system advantageous for high density recording.

The magnetic head drive circuit 119 of the medium drive section 4 operates so that a magnetic field modulated with the recording data inputted may be applied from the magnetic head 54 to the disk 51. Meanwhile, a clock signal synchronized with the recording data is outputted from the RLL (1, 7) modulation circuit 118 to a laser driver 120. The laser driver 120 drives the laser diode of the optical head 53 in response to the clock signal inputted thereto so that a laser pulse synchronized with the recorded data generated as the magnetic field by the magnetic head 54 may be irradiated upon the disk. Thereupon, the laser pulse emitted and outputted from the laser diode has a power based on required laser power suitable for recording. In this manner, the medium drive section 4 of the video camera of the present embodiment can perform a recording operation according to the laser strobe magnetic field modulation system.

5. Example of the Disk Structure Ready for the Present Embodiment

Subsequently, an example of the data structure of the disk 51 which can be used in the video camera of the present embodiment is described.

First, data units called sector and cluster of the format of the MD-DATA2 are described.

The sector is a minimum unit upon physical reading out of data from a disk, and a PSA (Physical Sector Address) is allocated to each sector.

The cluster is a minimum unit upon physical writing of data onto a disk, and a PSA is formed by a set of consecutive 16 sectors from 0h to Fh. A PCA (Physical Cluster Address) is allocated to each cluster. A particular sector which is in a lead-in area (pre-mastered area) which is hereinafter described can be specified uniquely by the PCA. Each pair of clusters in the tracks Tr•A and Tr•B in a recordable area are specified by the same PCA.

Figure 9:
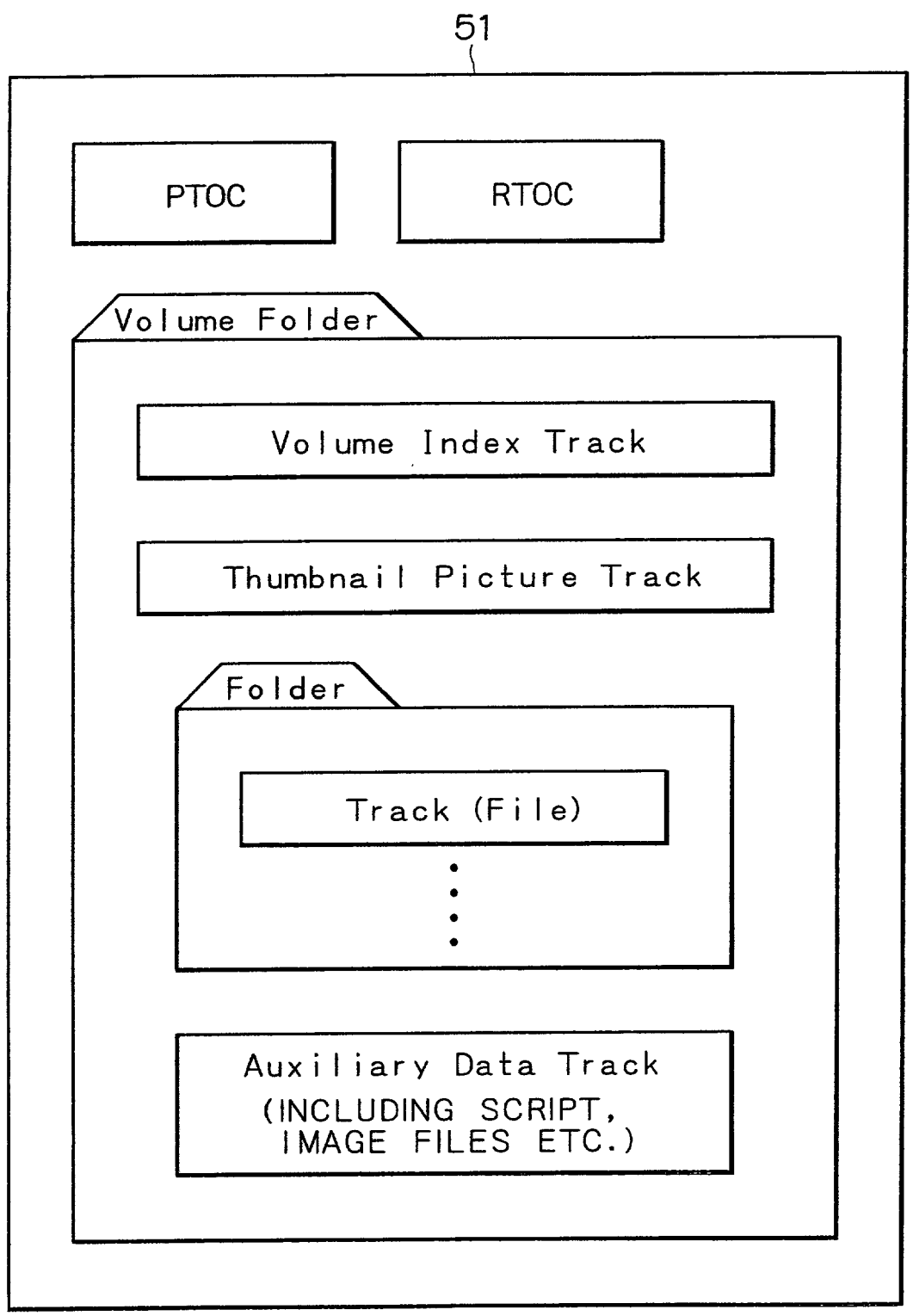
FIG. 9 is a diagrammatic view illustrating a concept of a data structure in the disk for use with the video camera.

FIG. 9 illustrates a concept of an example of a form of data management of the disk 51 applied in the video camera of the present embodiment. It is to be noted that the physical format of the disk 51 shown in FIG. 9 is such as described above with reference to FIGS. 1 and 2.

The disk 51 typically has a PTOC and a RTOC set as management information thereon. The PTOC has required management information recorded in the form of pits therein. The contents of the PTOC is disabled from being be rewritten.

The RTOC is used to typically store basic information necessary to manage data recorded on the disk.

In the form of data management illustrated in FIG. 9, information to be used to manage tracks (which may sometimes have the same significance as files) and folders (a folder is a structure for managing tracks in a group) upon recording and reproduction as data recorded on the disk is stored in the RTOC.

It is to be noted that contents of the RTOC are rewritten at any time typically in accordance with a result of recording of data onto the disk till then and a result of editing processing such as deletion of a track (file) or a folder.

User data are managed as a volume folder placed in one route folder. The volume in the present embodiment is defined as a complete set of user data, and it is prescribed that only one volume is present for one disk. Further, data included in the volume are stored as folders and tracks under the volume folder except those which are managed with the PTOC and the RTOC described above.

The volume folder has a volume index track (VIT) of a predetermined size (for example, 12 clusters) placed therein.

The volume index track is prescribed as an area in which, for example, where main management information is recorded in the PTOC and the RTOC, information regarded as sub management information is recorded. The volume index track has a table in which information to be used to manage properties regarding tracks (files), folders and auxiliary data, titles and packet data which form the tracks is recorded.

A thumbnail picture track can be disposed optionally as one of tracks which are managed in the volume holder.

In the video camera of the present embodiment, one still picture of a predetermined resolution can be provided as a thumbnail picture in a corresponding relationship to each of files recorded on a disk. A thumbnail picture is handled as a representative picture for allowing the file to be visibly recognized.

The thumbnail picture track has such thumbnail pictures recorded thereon together with index information which represents a corresponding relationship with the files (tracks) recorded on the disk and stored positions of the thumbnail pictures. The data length of the thumbnail picture track can be extended arbitrarily in response to the number of thumbnail pictures to be stored and some other parameter.

Image/sound data recorded by a user as a result of image pickup are managed in a unit of a file and placed as tracks under the volume file in the volume folder or placed in a folder placed under the volume folder.

In FIG. 9, it can be seen that a certain one file is represented as one track and this track is stored in a certain one folder. The folder is a structure for managing tracks or folders collectively in one group as described hereinabove.

Accordingly, a structure under the volume folder has an arbitrary number of tracks or folders stored therein within a range which is defined by a maximum number of cases which can be stored in the volume folder and a maximum number of stages of the hierarchical structure of the folder.

An auxiliary data track in which auxiliary data are stored is placed in the volume holder.

The information to be stored in the auxiliary data track may be any information depending upon, for example, an application actually applied.

In the video camera of the present embodiment, script information as reproduction control information is stored. Although detailed description is omitted here, also image data (Image) produced by "scribble editing" to a track (recorded picture file) are stored.

The PTOC and the RTOC which are management information described above as well as information stored on the volume index track (also such information is generally referred to as "management information" herein) are read out, for example, upon loading of the disk. The management information thus read out is placed into a predetermined area typically of the buffer memory 42 of the medium drive section 4 or into the buffer memory 32. Then, upon data recording or upon editing, the management information held in the buffer memory is rewritten in response to a result of the recording or a result of the editing. Thereafter, at a predetermined opportunity and timing, the management information of the disk 51 is rewritten or updated based on contents of the management information held in the buffer memory. Such updating, however, is not performed with the PTOC.

Figure 10:
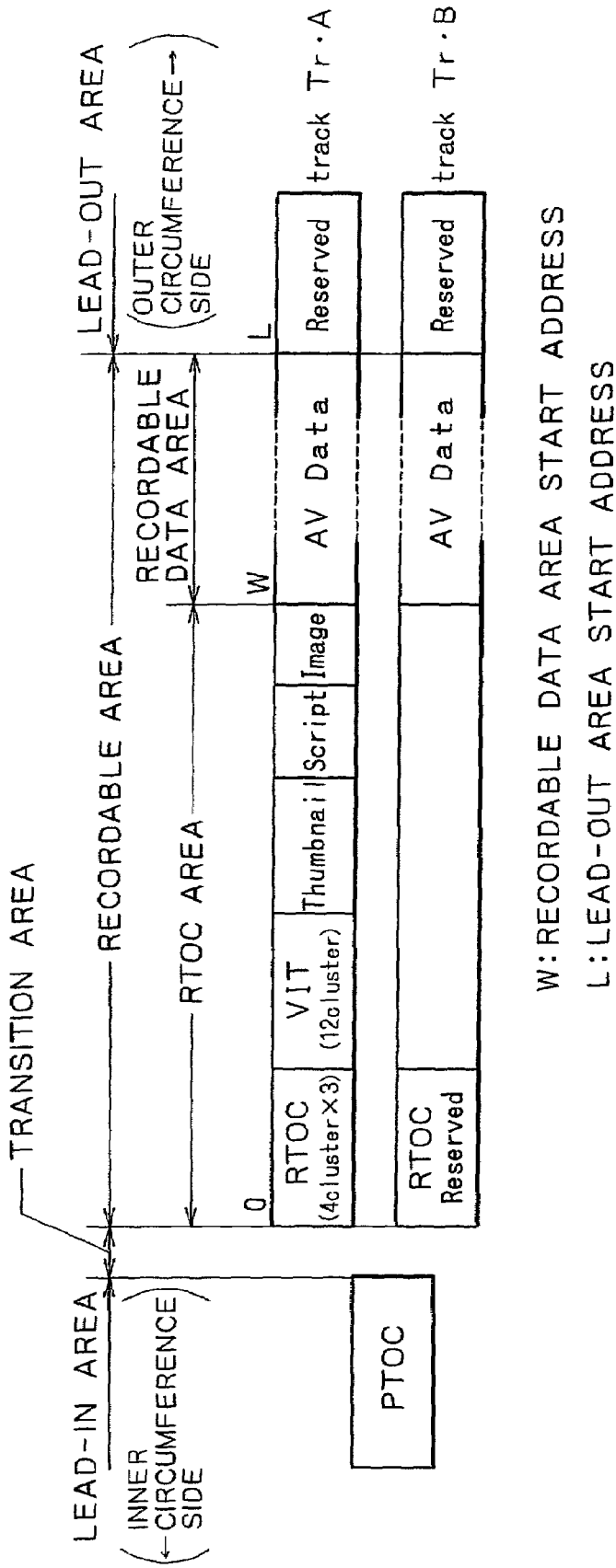
FIG. 10 is a diagrammatic view illustrating a concept of the data structure of FIG. 9 in contrast with physical regions of the disk.

FIG. 10 illustrates the data management form illustrated in FIG. 9 in a corresponding relationship to the physical structure of the disk 51.

A lead-in area shown in FIG. 10 is a pit area on the innermost circumference of the disk, and information of the PTOC is stored in this area.

On an outer circumference to the lead-in area, a recordable area including a transition area is formed. The recordable area is a magneto-optical recording area which allows magneto-optical recording and reproduction. In the recordable area, two tracks of the track Tr•A and the track Tr•B are formed in double spirals as described hereinabove with reference to FIGS. 1 and 2.

On the innermost circumference of the recordable area, an RTOC area is provided for both of the tracks Tr•A and Tr•B. In the RTOC area of the track Tr•A, information of the RTOC having a size of four clusters is recorded repetitively by three times. Following this, the volume index track (VIT) of a size of 12 clusters is disposed.

Next to the volume index track, a thumbnail picture track can be disposed optionally. The thumbnail picture track in the RTOC area is defined such that at least the first one cluster is positioned therein. For example, as the file number increases, the thumbnail picture data number increases, and if the thumbnail picture data number exceeds the capacity of the thumbnail picture track in the RTOC area, then thumbnail picture data can be recorded additionally in the recordable data area which is hereinafter described. Further, the thumbnail picture track on the recordable data area in this instance is managed with the volume index track or the RTOC.

Next to the thumbnail picture track of the RTOC area, an area in which scripts as auxiliary data and image data are recorded can be set optionally.

If the scripts and the image data exceed the capacities for them which can be recorded in the RTOC area, then they can be recorded additionally in the recordable data area in such a form that they are managed with the volume index track or the RTOC.

The recordable data area is provided beginning with an address position indicated by a recordable data area start address W. AV data, that is, data of tracks (files) can be recorded into the recordable data area. Also the thumbnail picture data and auxiliary data described above can be recorded into the recordable data area.

After the recordable data area comes to an end, a lead-out area is formed beginning with an address position indicated by a lead-out area start address L and ending with the outermost circumference.

While the foregoing description relates to the track Tr•A, the area setting for the track Tr•B applies similarly to that of the track Tr•A as can be seen from FIG. 10. However, the RTOC area in the track Tr•B is undefined at present. In short, the RTOC area is used substantially only with regard to the track Tr•A.

It is to be noted that the example of the disk structure shown in FIGS. 9 and 10 is a mere example at all, and the physical positional relationship of the individual areas on the disk may be modified in accordance with conditions of actual use and so forth. Also the structure in which data are stored may be modified.

6. Thumbnail Picture Production Process

A thumbnail picture to be stored on the thumbnail picture track shown in FIGS. 9 and 10 can be produced by the video camera of the present embodiment. Here, a thumbnail picture production process is described. Particularly, production of a thumbnail picture of an image file recorded already on a disk is described.

As described hereinabove, the management information (PTOC, RTOC and volume index track) recorded on the disk 51 is read out at a predetermined timing such as upon loading of the disk 51 and stored into the buffer memory 42 or the buffer memory 32.

The driver controller 46 refers to the management information stored, for example, in the buffer memory 42 to determine an address on the disk 51 at which image data designated as a thumbnail picture in a file with regard to which a thumbnail picture is to be produced are recorded. The driver controller 46 then executes control for accessing the address of the disk 51 to perform reading from the disk 51 to obtain the image data as a source of production of a thumbnail picture.

The image data are successively transmitted from the medium drive section 4 to the video signal processing section 3 so that they are supplied to the data processing/system control circuit 31.

It is to be noted that, unless otherwise specified, image data typically of the top frame or the top field in the file are designated as the image data to be defined as a source of production of a thumbnail picture by the management information.

The data processing/system control circuit 31 first controls the MPEG2 video signal processing circuit 33 to decompress the image data supplied thereto in accordance with the MPEG 2 format to obtain data decoded down to the level of image data of a unit of a field image.

In the stage of image data decoded down to the level of a unit of a field image, the image data have an image size (pixel number) sufficient to allow the image data to be displayed substantially in the full size on the display screen.

After image data of the full size in a unit of a field image are obtained in this manner, the MPEG2 video signal processing circuit 33 performs reduction processing for the full size image data to obtain an actually required size for a thumbnail picture.

For such reduction of the image size, typically signal processing is performed such that pixel data of the original image data of the full size are sampled out at suitable timings so that image data are re-constructed with the sampled pixel data.

Then, the video controller 38 produces index information described hereinabove with reference to FIG. 9 to the thumbnail picture data obtained in such a manner as described above. Then, the video controller 38 controls so that the thumbnail picture data are recorded onto the thumbnail picture track of the disk 51 together with the index information.

Thumbnail picture data for each file are obtained and recorded onto the disk 51 in this manner.

It can be recognized from the foregoing description that the video camera of the present embodiment allows recording not only of image data including sound data, but also of sound data based only on voice, character information data and other data as a file. However, where a file does not include image data which make a source of production of a thumbnail picture such as, for example, a file of sound data or character information data, for example, image data of a design pattern from which a user can visually recognize that the data are sound data or character information data may be prepared in advance and utilized later as a thumbnail picture. Such image data of a design pattern may be stored, for example, in the ROM of the video controller 38 or in a predetermined area of the disk.

7. Script

The video camera of the present embodiment can be used to perform such editing processing as to designate the order in reproduction of files, principally recorded image files, recorded by the video camera or provide a required special effect on a file upon reproduction.

In order to allow such editing as described above, the video camera of the present embodiment prepares a script as reproduction control information which can provide a particular reproduction output form to a recorded image file, and the script is interpreted, for example, by the video controller 38 to obtain a reproduction output form (for example, a reproduction order) in accordance with a result of the editing. Further, in the editing stage, contents of the script are updated to execute editing processing. It is to be noted here that the "script" is a program described using a predetermined program language in order to reproduce and output moving picture data, still picture data, sound data, document data and other necessary data at a simultaneous timing.

The script which is used as reproduction control information in the video camera of the present embodiment is described roughly.

The video camera of the present embodiment adopts the SMIL (Synchronized Multimedia Integration Language) for the script.

The SMIL is a language standardized by the W3C (a standardization organization of the Internet), for example, in order to realize television program broadcasting, presentation and so forth on the Internet. The SMIL is proposed to realize time series presentation and so forth based on the grammar of the XML (a superset of the HTML).

First, scheduling is represented by two tags of

<seq> and <par>.

<seq> signifies sequential, and information placed between two such tags is reproduced in order of time.

<par> signifies parallel, and information placed between two such tags is reproduced in synchronism.

If it is intended, for example, to reproduce files of image data recorded on a disk and represented by video1, video2 and video3 in order of video1→video2→video3, then this is described like <seq>
 <video src="video1">
 <video src="video2">
 <video src="video3">
</seq> or

<seq>
 <play video1>
 <play video2>
 <play video3>
</seq>

If it is intended to reproduce the image data files video1, video2 and video3 in order of video1→video2→video3 and reproduce a file audio1 of sound data simultaneously as a post-recording track, then this is described like <seq>
 <par>
 <video src="video1">
 <audio src="audio1">
 </par>
 <video src="video2">
 <video src="video3">
</seq>

Also a description for designating that reproduction of a file to be reproduced in synchronism with a certain file be started at a position later by a particular time (seconds) after starting of reproduction of the certain file or for a like designation is prepared.

If it is intended to display a caption (an image, for example, for character information) after 5 seconds after the image file video1 is displayed (reproduced), then this is described like <par>
 <video src="video1">
 <image src="scratch1"begin="5s">
</par>

If it is intended to designate that, for example, a still picture file picture1 be displayed for 5 seconds, then this is described like <image src="picture1" dur="5s">

In order to reproduce part of a certain moving picture file in an extracted manner called frame mute, "range" is used. For example, where the SMPTE (Society of Motion Picture and Television) standards are adopted for a time code, this is described like <video src="video1"range="smpte:10:07:00–10:07:33">

In order to designate and repeat a certain file, "repeat" is used. For example, when it is intended to repeat the file video1 10 times, this is described like <video src="video1"repeat="10">

The video camera of the present embodiment can utilize such scripts called SMIL as given above to execute display control for providing a thumbnail picture display with a required display form.

To this end, a subset of the XML is prepared in the video camera system of the present embodiment so as to allow interpretation compliant with the SMIL and description (production) of a script. The XML subset may, for example, be stored as a program to be executed by the video controller 38 in the program memory 39 or the like or be recorded into an application layer of a disk so that it may be read out later.

In the video camera of the present embodiment, such a script as described above is produced or updated by the video controller 38 and stored typically into a predetermined area of the buffer memory 32 typically in a stage of editing or in a stage wherein a recording operation is being performed.

The script stored in the buffer memory 32 in this manner is recorded onto a disk in a predetermined opportunity or at a predetermined timing. Data of the script are stored as a script file onto the auxiliary data track described hereinabove with reference to FIGS. 9 and 10. When the disk on which the script is recorded on the disk in this manner is newly loaded into the video camera next time, editing reproduction or like reproduction can be performed in accordance with the order of reproduction obtained by the preceding editing if the script recorded on the disk is read out and stored, for example, into the buffer memory 32 and then referred to.

8. Operation Screen Display

When search for a file recorded on a disk or various editing and/or setting processing is to be performed by the video camera of the present embodiment, an operation screen is displayed on the display panel 67.

The operation screen displays various kinds of information regarding a disk loaded at present and files and so forth recorded on the disk. Various operations for certain objects can be realized by use of both of a depression operation (hereinafter referred to as pointing operation) on the operation screen and operations of various operation elements.

The operation screen of the video camera of the present embodiment is constructed so as to also perform thumbnail display for presenting thumbnail pictures (small images) corresponding to individual files recorded on a disk loaded at present. Consequently, the user can look at the thumbnail pictures displayed on the operation screen to visually confirm contents of the files (tracks) recorded on the disk. Further, search for a file, reproduction of a file or the like can be performed by an operation for any of the thumbnail pictures.

Figure 11:
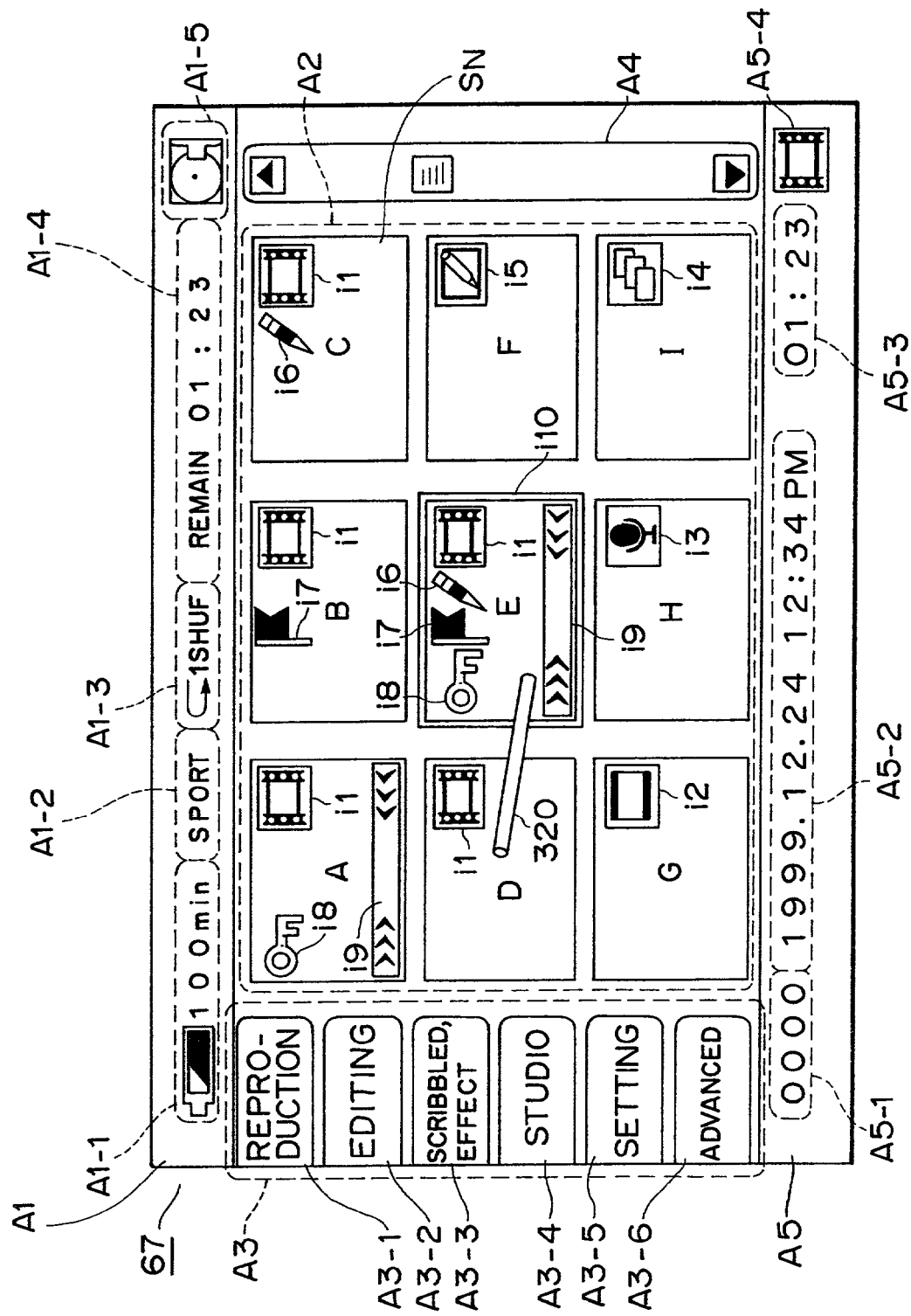
FIG. 11 is schematic view showing an example of a form of display of an operation screen (thumbnail picture display) of the video camera.

FIG. 11 illustrates an example of a form of display of the operation screen displayed on the display panel 67 of the video camera of the present embodiment.

Referring to FIG. 11, the operation screen shown is displayed as an initial screen typically when a reproduction/edit mode is entered while a disk is loaded in the video camera.

In the operation screen shown, an information display area A1 is provided in an upper stage of the display area. The information display area A1 is provided in order to display various kinds of information required by a user. The information display area A1 has a battery remaining amount display area A1-1, a sports mode display area A1-2, a reproduction mode display area A1-3, a recording remaining time display area A1-4, and a disk icon A1-5 disposed therein.

The battery remaining amount display area A1-1 is provided to display a battery remaining capacity using a symbol of a battery and time.

Although detailed description is omitted here, the video camera of the present embodiment can be set to a sports mode as a kind of reproduction mode. In the sports mode, for example, frame feeding reproduction is performed so that the motion of an image pickup object or the like imaged by the user can be confirmed. The sports mode display area A1-2 is used, when the sports mode is set, to display, for example, a character string "SPORT" as seen in FIG. 11 to inform the user that the sports mode is set at present.

The reproduction mode display area A1-3 is used to indicate various special reproduction modes such as, for example, shuffle reproduction, repeat reproduction and A-B section reproduction using characters, a symbol or symbols or the like.

The recording remaining time display area A1-4 is used to indicate a remaining recordable capacity of a disk in the form of time.

The disk icon A1-5 is displayed typically when a disk is loaded in the video camera. If a pointing operation is performed to the disk icon A1-5, then the displayed screen can be changed over from the operation screen shown in FIG. 11 to a disk information screen on which various kinds of information regarding the disk loaded at present are displayed.

A thumbnail picture display area A2 is provided on the lower side of the information display area A1. The thumbnail picture display area A2 can display nine thumbnail pictures for nine files to the utmost. In FIG. 11, the thumbnail picture display area A2 is shown wherein A to I thumbnail pictures SN are displayed. Where a file corresponding to any thumbnail picture SN actually is, for example, a recorded picture file, though not shown in FIG. 11, an image extracted from the recorded picture file is displayed in the form of a still picture as the thumbnail picture SN.

Further, the thumbnail pictures SN arranged in the alphabetical order of the characters A to I in FIG. 11 are actually arranged basically in the order of reproduction. In other words, in the video camera of the present embodiment, thumbnail pictures can be displayed in a predetermined order of arrangement according to the order of reproduction of files designated by the script. However, if such an operation as sorting is performed, then the thumbnail pictures are displayed in the sorted order.

The number of thumbnail pictures that can be displayed at a time on the operation screen shown in FIG. 11 is 9 as described above. However, also when the number of tracks or files recorded on a disk is greater than 9 and consequently the number of thumbnail pictures is greater than 9 as well, they can be displayed making use of a scrolling scheme. In particular, the user will perform a pointing operation and a dragging operation to and for a scroll bar A4 displayed on the right-hand side of the thumbnail picture display area A2. Thereupon, those thumbnail pictures which are displayed in the thumbnail picture display area A2 are scrolled upwardly or downwardly.

Various icons are displayed in an overlapping relationship on each of the thumbnail pictures SN displayed in the thumbnail picture display area A2.

In particular, a moving picture icon i1 indicates that moving pictures are recorded in a file to which the thumbnail picture on which the icon is displayed in an overlapping relationship corresponds. In FIG. 11, it can be recognized that the thumbnail pictures A, B, C, D and E are moving picture files.

The icon displayed on the thumbnail picture G is a still picture icon i2, which indicates that the corresponding file is a still picture file.

An interview file icon i3 is displayed on the thumbnail picture H and indicates that the corresponding file is an interview file recorded in the interview mode described hereinabove.

A group icon i4 is displayed on the thumbnail picture I. The video camera of the present embodiment can manage files on a disk such that a plurality of ones of the files which are consecutive in the order of reproduction as a file group and can display a thumbnail picture for the group of files. The group icon i4 is displayed in an overlapping relationship on a thumbnail picture which corresponds to a group of files managed in this manner.

The icon displayed on the thumbnail picture F is a memo file icon i5. The video camera of the present embodiment has a kind of editing function of producing contents of notes taken by a user as one independent file. If such a memo file as just described is inserted and reproduced typically before a certain file, then contents of the file, which may represent the title of the file, can be displayed based on the memory file. The memo file icon i5 indicates that the corresponding file is a memo file.

The icon displayed on the thumbnail pictures C and E and representing a pencil is a scribbling icon i6. The video camera of the present embodiment has a kind of editing function of adding an image like a scribbled pattern to an image file recorded already. The image like a scribble pattern may be provided by a locus of operation on the display panel 67 performed by a user typically using the pen 320 or by a pasting operation of a stamp image.

The scribbling icon i6 indicates that the corresponding file is a file scribbled using the scribbling function.

A mark icon i7 is displayed on the thumbnail pictures B and E. The user can perform such an operation as hereinafter described to apply a mark to any file. For example, the user can apply a mark to a file which is high in significance to the user so as to remind the user itself of this fact. The mark icon i7 indicates that the mark is applied to the corresponding file.

A lock icon i8 is displayed on the thumbnail pictures A and E. The user can similarly perform such an operation as hereinafter described to set "lock" to any file so that the file may be prevented from any variation such as deletion or editing or a like operation. The lock icon i8 indicates that the file is locked.

An effect icon i9 is displayed on the lower side of the thumbnail pictures A and E. The video camera of the present embodiment is so configured that it can provide a special reproduction effect such as, for example, various scene changes and mosaic, and the effect icon i9 indicates that the corresponding file has such special effect or effects given thereto.

In the video camera of the present embodiment, various icons are displayed in an overlapping relationship with a thumbnail picture so that a user may visually recognize various attributes of a file corresponding to the thumbnail picture such as a type of the file and various setting situations.

A pointer icon i10 is displayed such that it borders the thumbnail picture E. Typically when the user performs a pointing operation to the thumbnail picture, to which the pointer icon i10 is applied, using the pen 320, the pointer icon i10 is displayed in a displaced relationship from the pointed thumbnail picture. The thumbnail picture disposed on and indicated by the pointer icon i10 is currently selected.

Here, if the user operates the reproduction/pause key 308, then reproduction is started from the track selected with the pointer icon i10 disposed thereon. If a pointing operation is performed again for the thumbnail picture on which the pointer icon i10 is displayed, then reproduction is started from the track on which the pointer icon i10 is disposed.

A menu key area A3 on which various menu keys are displayed is provided on the left side to the thumbnail picture display area A2.

In the menu key area A3, a reproduction menu key A3-1, an editing menu key A3-2, a scribbling-effect menu key A3-3, a studio menu key A3-4, a setting menu key A3-5 and an advanced menu key A3-6 are displayed in order from above.

The reproduction menu key A3-1 is used to present a menu for various types of reproduction to allow setting and can set, for example, a reproduction mode which is reflected in the reproduction mode display area A1-3.

The editing menu key A3-2 presents a menu in which various items relating to editing in a unit of a recorded file are presented so that typically movement, copy, deletion or division of a track (file), classification of files into groups or extraction of a still picture, which typically is selection of a still picture to be displayed as a thumbnail picture, may be performed. Further, the menu based on the editing menu key A3-2 allows an operation for changing over the display screen to a track information screen on which track information is displayed and various setting operations can be performed for information of each track.

The scribbling-effect menu key A3-3 presents a menu which has a scribbling function and allows setting of various special reproduction effects such as a scene change (fade-in, fade-out, wipe or the like), sound special effects, or image special effects (mosaic, or sepia processing).

The video camera of the present embodiment has a function of producing a video work simply and readily when the user proceeds with recording and operation in accordance with a GUI. The studio menu key A3-4 is used to display a menu suitable for the simple video work production function just described.

The setting menu key A3-5 presents a menu for setting various parameters such as, for example, the brightness of the screen of the display unit 6A, the shade of the panel color, the brightness of the viewfinder, the date and the hour, and a still picture setting time.

The advanced menu key A3-6 presents a menu regarding a connection function to an external apparatus such as, for example, a personal computer, a demonstration mode and so forth.

A track information display area A5 is provided in a stage below the display area. The track information display area A5 displays information regarding a track corresponding to a thumbnail picture selected (with the pointer icon i10 disposed thereon) in the thumbnail picture display area A2.

In the track information display area A5, a track number is indicated in a track number display area A5-1; a recording date and hour and a title applied to the track are displayed alternately after each predetermined time (typically several seconds) in a date/title display area A5-2; and a total time of the track is displayed in a time display area A5-3.

Further, a shortcut icon A5-4 displays one of the various icons described hereinabove (for example, the moving picture icon i1, still picture icon i2, interview file icon i3, group icon i4 and memo file icon i5) in response to a type of a file corresponding to a selected thumbnail picture, presence or absence of group setting, and so forth. If a pointing operation is performed to the shortcut icon A5-4, then the display screen is changed over to the track information screen.

An example of an operation for the menu key area A3 is described below with reference to FIG. 12 by way of an example of an operation for the reproduction menu key A3-1.

Figure 12:
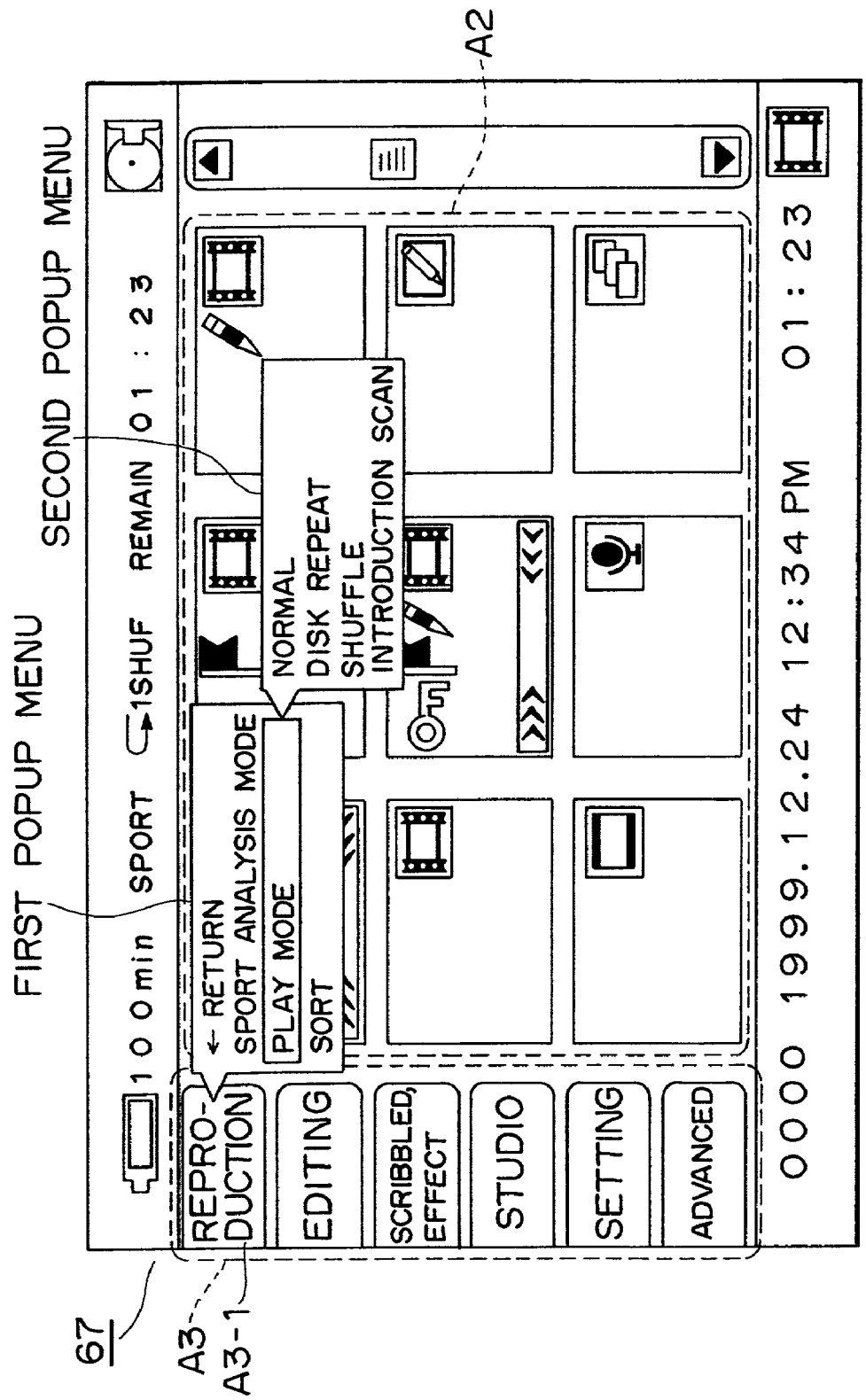
FIG. 12 is a schematic view illustrating an example of an operation to a reproduction menu key of the operation screen shown in FIG. 11.

If the user performs a pointing operation to the reproduction menu key A3-1 typically using the pen 320, then a first popup menu is displayed as seen in FIG. 12. The first popup menu in this instance includes display of menu items of "←Return", "Sport analysis mode", "Play mode" and "Sort". If, for example, the jog dial 303 is operated to rotate (or a dragging operation for the screen is performed using the pen 320) while the first popup menu is displayed, then the selected item is successively changed over in response to the direction of the rotation of the jog dial 303. Then, if the "Play mode" is selected as seen in FIG. 12 and the jog dial 303 is operated so as to be depressed (or alternatively a pointing operation for more than a fixed time may be performed using the pen 320), then a second popup menu is displayed.

The second popup menu includes display of four items of "Normal", "Disk repeat", "Shuffle" and "Introduction scan". The user can select and decide a desired one of the items by performing an operation similar to the operation for the first popup menu described above. A play mode set in this manner is typically reflected on display contents of the reproduction mode display area A1-3 shown in FIG. 11.

9. Data Communication System in the Embodiment 9-1. Example of the System Configuration The video camera of the present embodiment having the configuration described above can mutually communicate with an external apparatus through the external interface 8 when the external apparatus is connected to the I/F terminal T3 of the video camera.

Different configurations of a system wherein the video camera of the present embodiment and an external apparatus are connected to each other are described with reference to FIGS. 13A, 13B and 13C.

Figure 13A:
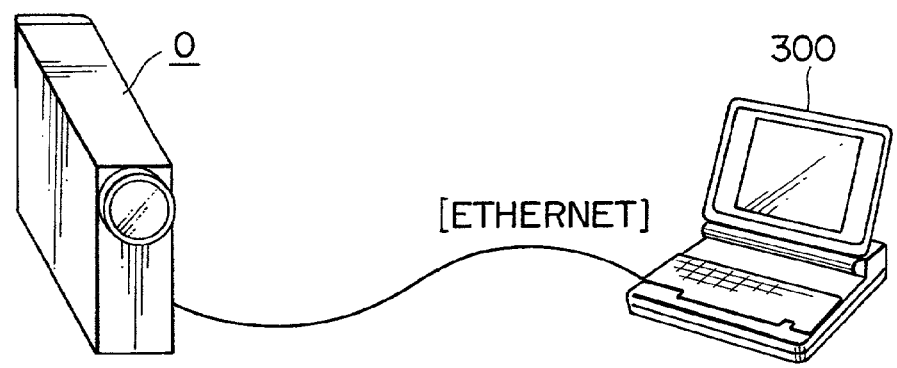
FIG. 13A is a perspective view showing an example of a system construction wherein the video camera and a personal computer are connected to each other.

Referring first to FIG. 13A, the system shown includes a video camera 0 of the present embodiment and a personal computer apparatus 300 connected to each other. In the present system, the video camera 0 and the personal computer apparatus 300 are connected to each other by an ethernet. Physically, an ethernet terminal of the personal computer apparatus 300 and the I/F terminal T3 of the video camera 0, which as well is an ethernet terminal, are connected to each other by a cable.

Figure 13B:
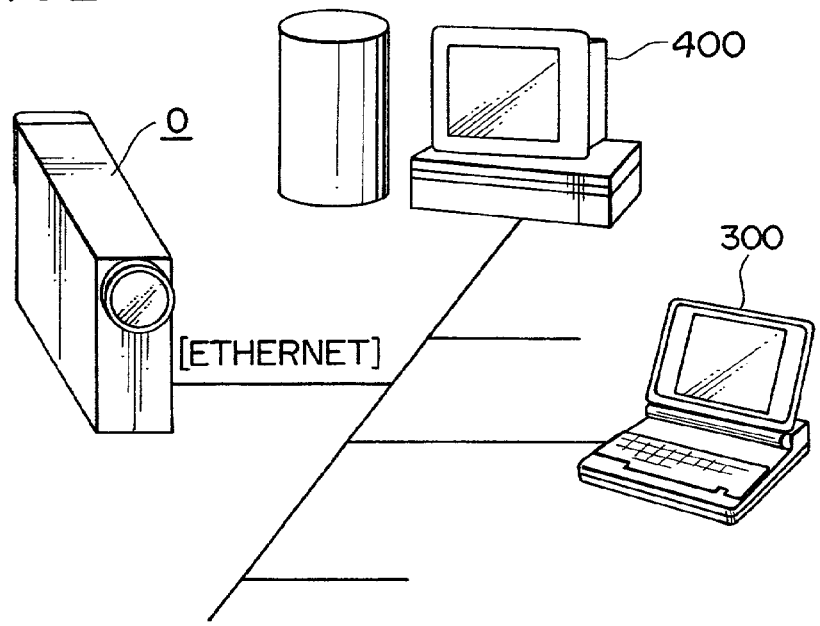
FIG. 13B is a perspective view showing another example of a system construction wherein a server is provided as a principal component and the video camera and a personal computer are connected to each other.

Referring now to FIG. 13B, the system shown includes the video camera 0 connected to a transmission line of a LAN which includes a server 400 as a principal component. The transmission line of the LAN here is an ethernet. Accordingly, also in this instance, the I/F terminal T3 of the video camera 0 as an ethernet terminal is utilized in order to physically connect the video camera 0 to the transmission line of the LAN.

FIG. 13B further shows a personal computer apparatus 300 connected to the LAN. In the system shown, the video camera 0 of the present embodiment and the personal computer apparatus 300 can communicate with each other.

Figure 13C:
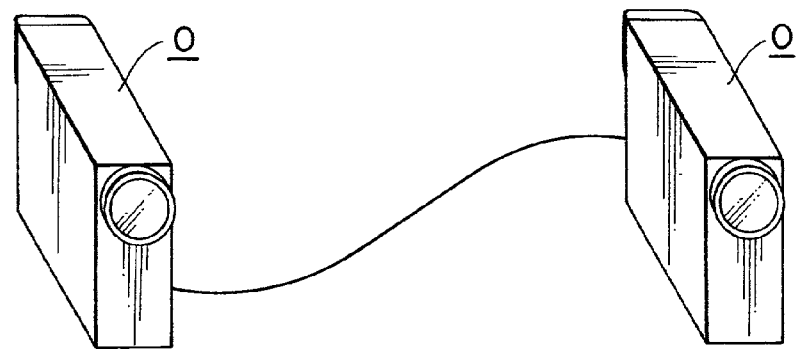
FIG. 13C is a perspective view showing a further example of a system construction wherein the video cameras and another video camera of the same construction are connected to each other.

Referring now to FIG. 13C, the system shown includes the video camera 0 of the present embodiment and another image data recording and/or reproduction apparatus connected to each other. The system shown in FIG. 13C particularly includes two video cameras 0 of the present embodiment connected to each other.

The ethernet mentioned above may be used as the interface for communication in the system shown in FIG. 13C. However, taking it into consideration that the apparatus connected to each other here are image recording and/or reproduction apparatus, some other data interface such as an IEEE 1394 interface or a USB (Universal Serial Bus) interface may be adopted alternatively. In other words, no network connection may be employed intentionally.

For example, if the IEEE 1394 interface is used for the connection, then the external interface 8 is so configured as to comply with the IEEE 1394 interface and the I/F terminal T3 is formed with a terminal form compliant with the IEEE 1394.

9-2. Examples of the System Operation 9-2-1. PC Connection Setting

Now, system operation of the video camera of the present embodiment where the examples of system configuration described hereinabove with reference to FIGS. 13A to 13C are used is described. It is to be noted that, for the purpose of simplified description, description is given of system operation where systems of the system configurations of FIGS. 13A and 13B from among the system configurations shown in FIGS. 13A to 13C are constructed.

In the system configurations shown in FIGS. 13A and 13B, the personal computer apparatus 300 serves as an apparatus which communicates with the video camera 0 of the present embodiment. In this instance, between the video camera 0 and the personal computer apparatus 300 connected to each other by an ethernet, the video camera 0 functions as a server while the personal computer apparatus 300 functions as a client as hereinafter described in more detail. Further, since the systems shown in FIGS. 13A and 13B use an ethernet for connection, they adopt the IP (Internet Protocol) as a communication protocol as described hereinabove.

Therefore, the video camera 0 of the present embodiment which functions as a server must set an address so that it may access the personal computer apparatus 300.

Thus, an operation procedure for setting an address on the video camera 0 is described below.

Figure 14A:
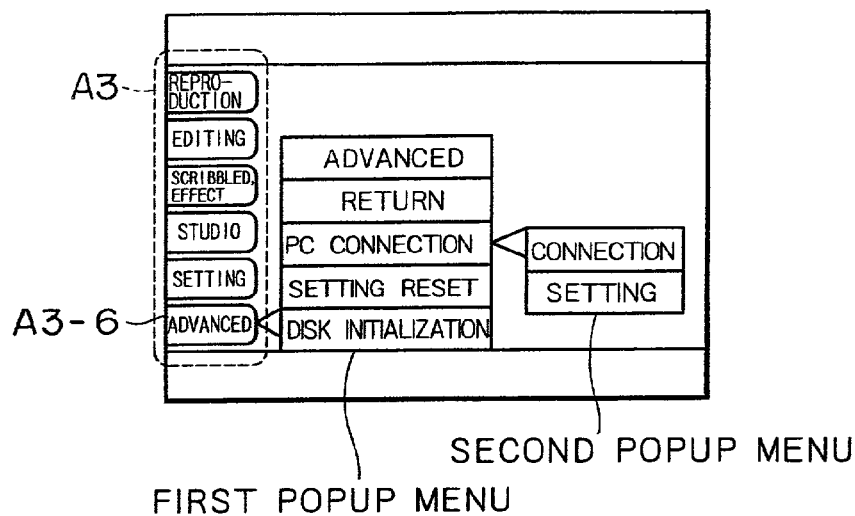
FIG. 14A is a schematic view showing an operation screen displayed on the display panel of the video camera when PC connection setting is selected.

FIG. 14A shows an operation screen displayed on the display panel 67. The operation screen is similar to the operation screen shown in FIG. 11, but detailed display in the screen is omitted in FIG. 14A while only the menu key area A3 is shown.

If it is assumed that the user performs a pointing operation to the advanced menu key A3-6 using the pen 320, then the first popup menu is displayed shown in FIG. 14A.

The first popup menu includes a display of "PC connection" as one of menu items. If the user performs an operation to select the "PC connection", then the second popup menu in which items regarding the "PC connection" are indicated is displayed as seen in FIG. 14A.

The second popup menu regarding the "PC connection" includes a display of two items of "Connection" and "Setting". If the user performs a predetermined operation to select the item of "setting", then such a PC connection setting screen as shown in FIG. 14B is displayed.

Figure 14B:
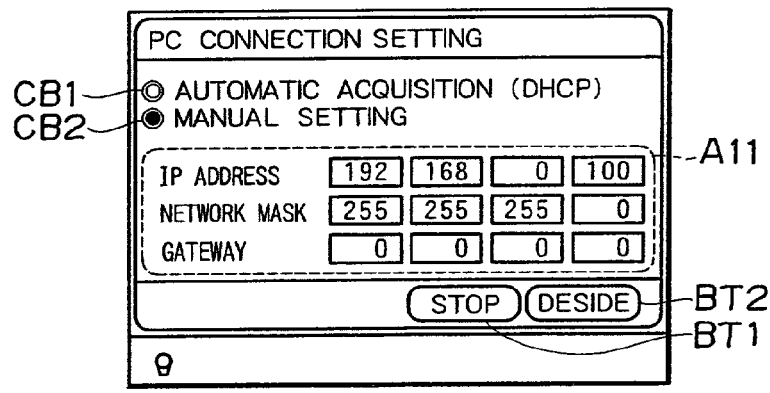
FIG. 14B is a similar view but showing a PC connection setting screen displayed on the display panel of the video camera.

The connection setting screen shown in FIG. 14B includes a display of two check boxes CB1 and CB2 for allowing selection between automatic acquisition and manual setting as an address setting operation.

The user can perform a pointing operation to the check box CB1 or CB2 to effect checking or cancellation of the check of the check box CB1 or CB2. In other words, it can be set whether an address should be acquired automatically or should be set manually. It is to be noted that conditions in accordance with which automatic acquisition or manual setting of an address should be used are hereinafter described.

An address setting area A11 is displayed below the check boxes CB1 and CB2. The address setting area A11 includes a display of setting items for an IP address, a network mask and a gateway disposed in order from above. The address setting area A11 further includes a display of input boxes into which numerical values are to be placed for each of the setting items. For example, as regards the IP address, a value indicated the input boxes therefor indicates an IP address.

A stop button BT1 and a decision button BT2 are displayed below the address setting area A11. The decision button BT2 is provided to decide contents of setting performed for the PC connection setting screen by the user. On the other hand, if the user operates the stop button BT1, then contents of any setting performed for the PC connection setting screen displayed till then are cancelled so that the setting contents are cleared to the old setting contents. Further, the operation screen shown in FIG. 14A is restored. In this instance, the operation screen includes no display of the popup menus.

The following operation may be performed to the PC connection setting screen described above.

First, the user will perform an operation of applying a check mark to one of the check boxes CB1 and CB2 to set whether the address setting operation should be performed as automatic acquisition or manual setting.

The address setting operation should be performed as automatic acquisition where the video camera 0 is connected to such a LAN system as shown in FIG. 13B.

In the system shown in FIG. 13B, the server 400 serves as a DHCP (Dynamic Host Configuration Protocol) server. In other words, the server 400 is configured so that it can automatically set network parameters using the DHCP.

The DHCP is a protocol of the client/server type, and the server dynamically allocates, when each client starts up, an IP address to the client and notifies the client of network parameters such as a default path. Simultaneously, the server can notify the client of information of a gateway address, a domain name, a sub network mask and so forth.

Accordingly, the system shown in FIG. 13B has an environment wherein the video camera 0 serving as a DHCP client can automatically set an address in response to a notification from the server 400. Therefore, in such a case as just described, the user can set the address setting operation to automatic acquisition.

Where the address setting operation is set to automatic acquisition in this manner, the user need not perform an inputting operation of a numerical value of an address into the address setting area, but can operate the decision button BT2 to settle the automatic acquisition setting.

On the other hand, where the video camera 0 is not connected to the environment of a LAN which includes a server such as the system shown in FIG. 13A wherein the video camera 0 and the personal computer apparatus 300 are connected to each other by an ethernet to communicate with each other, such automatic setting of an IP address from the server 400 as described above cannot be performed. Therefore, the address setting operation is set to manual setting.

Where the address setting operation is set to manual setting, the user will manually set an address. For example, in order to set an IP address, the user will perform pointing operations of the pen 320 or the like to the input boxes for the IP address in the address setting area A11 in accordance with a predetermined procedure to successively input numerical values of the IP address. It is to be noted that the IP address is specified in an instruction manual or a like material in advance, and therefore, upon manual setting, the user can perform the inputting operation in accordance with the contents of the instruction manual. Also numerical values for the network mask and the gateway can be inputted in a similar procedure.

After the manual inputting operation into the address setting area A11 is completed in such a manner as described above, the user will operate the decision button BT2.

The user can perform user setting regarding an address by performing operations to the PC connection setting screen in such a manner as described above. However, actual address setting in accordance with the setting contents is performed when power supply is made available subsequently. Therefore, in the video camera of the present embodiment, if the user performs a setting operation to the PC connection setting screen in such a manner as described above and then operates the decision button BT2, then though not shown, a dialog which urges the user for re-starting is displayed. Then, if the user performs an operation for accepting the dialog, then the video camera 0 is re-started and an address is set upon such re-starting. The process is illustrated in a flowchart of FIG. 18.

Figure 18:
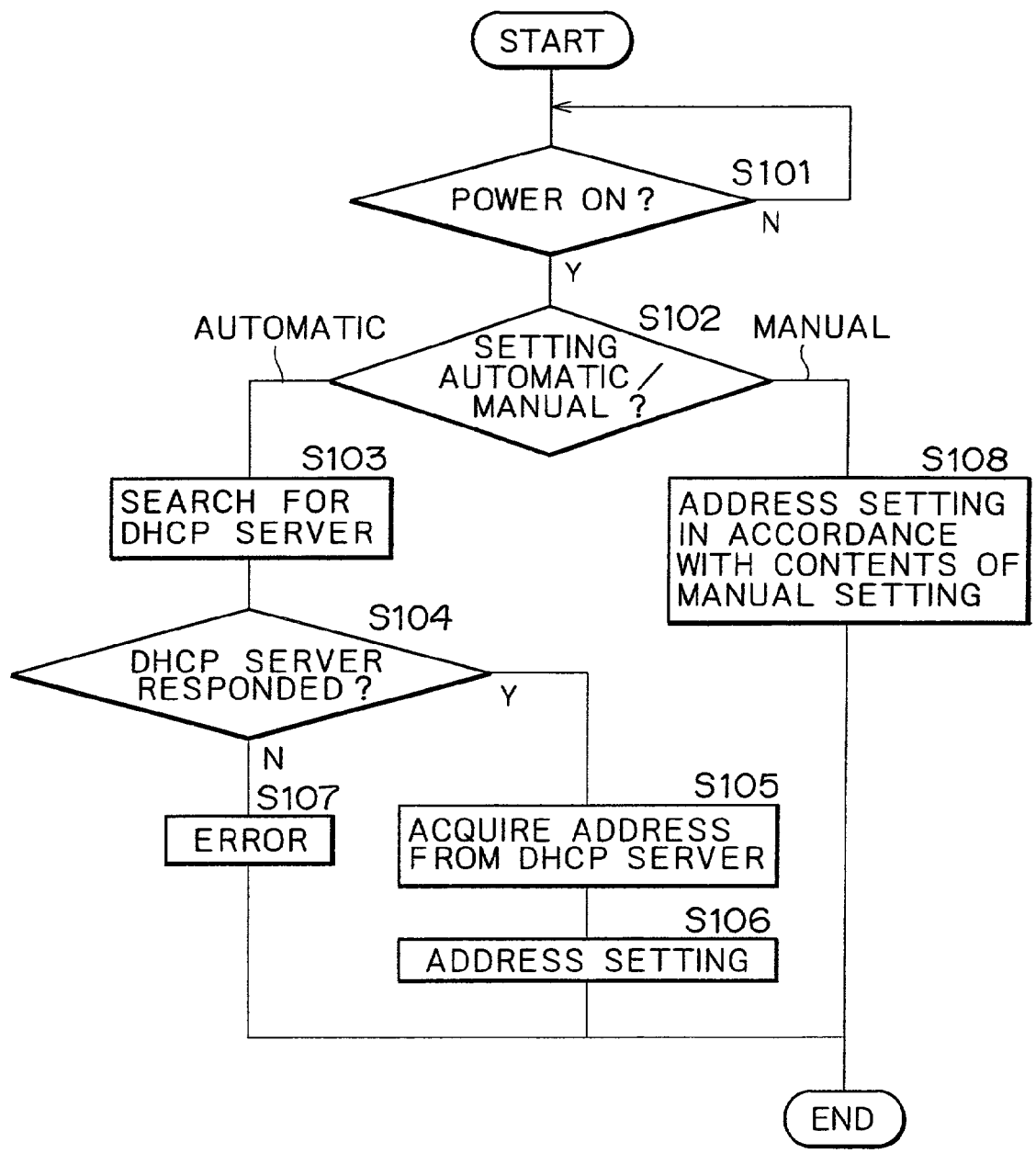
FIG. 18 is a flowchart illustrating processing operation of the video camera for address setting.

The video controller 38 serving as a master controller executes the process illustrated in FIG. 18.

Referring to FIG. 18, the video controller 38 first discriminates in step S101 whether or not the power supply state to the video camera 0 changes from an off state to an on state. In other words, the video controller 38 discriminates whether or not a power on state has been obtained as a result of such re-starting of the video camera 0 as described above.

If an affirmative result is obtained in step S101, then the video controller 38 advances its processing to step S102.

PC connection setting information which is contents set by an operation to the PC connection setting screen described hereinabove with reference to FIG. 14B is stored typically in a reloadable memory such as an EEPROM provided in the video controller 38.

In step S102, the video controller 38 refers to the PC connection setting information stored in the memory to discriminate whether an address should be set by automatic acquisition or by manual setting. Then, if an address should be set by automatic acquisition, then the video controller 38 advances its processing to step S103.

In step S103, the video controller 38 executes processing for searching for a DHCP server (the server 400) from the LAN to which the video camera 0 is connected. Then in next step S104, the video controller 38 discriminates whether or not a response is received from a DHCP server.

If the video camera 0 is connected to a LAN, then the video controller 38 normally receives a response from a DHCP server, and consequently, an affirmative result is obtained in step S104. In this instance, the video controller 38 advances its processing to step S105, in which it executes a process for acquiring an IP address from the DHCP server. Further, if necessary, the video controller 38 performs a process for acquiring a gateway address and a sub network mask as well in step S105.

Then in next step S106, the video controller 38 sets the address acquired in step S105 as an address of the video camera 0 itself.

The video controller 38 may not successfully acquire a response from the DHCP server, for example, because of some fault. In this instance, a negative result is obtained in step S104, and the video controller 38 thus advances its processing from step S104 to step S107, in which the video controller 38 executes an error process. As the error process in step S107, the video controller 38 may stop the address setting process and execute display control so that a display for notifying the user of occurrence of an error may be provided on the display unit 6A.

On the other hand, if it is discriminated in step S102 that the address setting operation is set to manual setting, then the video controller 38 advances its processing to step S108.

In this instance, contents of the PC connection setting information stored in the memory in the video controller 38 includes information of an address value manually inputted in such a manner as described above with reference to FIG. 14B.

In step S108, the video controller 38 sets an address in accordance with the information of the address value of the PC connection setting information.

9-2-2. Example (1) of the System Operation

After an IP address is set by the video camera 0 in such a manner as described above, system operation of the video camera 0 of the present embodiment can thereafter be obtained by connecting the video camera 0 and the personal computer apparatus 300 for communication with each other in such a manner as described below.

In the following, the system operation of the present embodiment is described in accordance with an operation procedure of a user.

Before the video camera 0 and the personal computer apparatus 300 are connected to each other for communication therebetween, the video camera 0 must first be placed into a mode in which it can be connected to the personal computer apparatus 300. An operation procedure necessary for this is described with reference to FIGS. 14A and 14C.

Typically, the user will confirm that the video camera 0 is physically connected to the personal computer apparatus 300 for mutual communication. Then, the user will perform a pointing operation to the advanced menu key A3-6 of the operation screen displayed on the display unit 6A of the video camera 0 to cause the first popup menu to be displayed on the display unit 6A. Further, the user will perform a pointing operation to cause the second popup menu, which is in a layer under the item of "PC connection" of the first popup menu, to be displayed.

Then, the user will perform a predetermined operation for selectively deciding the item of "Connection" from between the items displayed in the second popup menu.

Figure 14C:
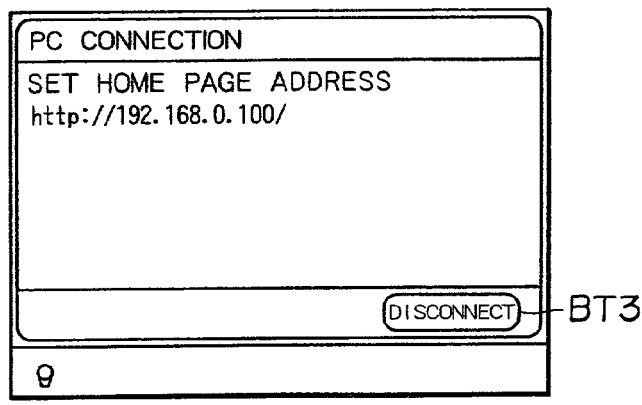
FIG. 14C is a similar view but showing a screen displayed on the display panel of the video camera upon completion of PC connection.

When the item of "Connection" is selectively decided, the screen of the display unit 6A is changed over to a display of the PC connection screen shown in FIG. 14C. In the present embodiment, it is indicated by such display of the PC connection screen that the video camera 0 has entered a mode in which it can be connected to a PC.

The PC connection screen displays the IP address set to the video camera 0 at present, for example, like "Set homepage address http://192.168.0.100/" as seen in FIG. 14C in order to present the IP address to the user.

A disconnection button BT3 is displayed on the lower side of the PC connection screen. The disconnection button BT3 is operated in order to disconnect the connection to the personal computer apparatus 300 on the video camera 0 side.

After the mode in which video camera 0 can be connected to the personal computer apparatus 300 is established in such a manner as described above, the user typically will operate the personal computer apparatus 300 to start up a web browser on the personal computer apparatus 300. The web browser here is browser software for accessing a web page started up on the Internet and allows outputting of a web page file produced broadly in the HTML format.

Such a web browser as just described is frequently preinstalled in an ordinary personal computer for consumers already when it is purchased. Even if it is not preinstalled in a personal computer, it can be acquired at a low expense or charge-free and installed readily into the personal computer.

Thus, the video camera 0 of the present embodiment makes use of web browser software which has been popularized best for personal computers.

Figure 15:
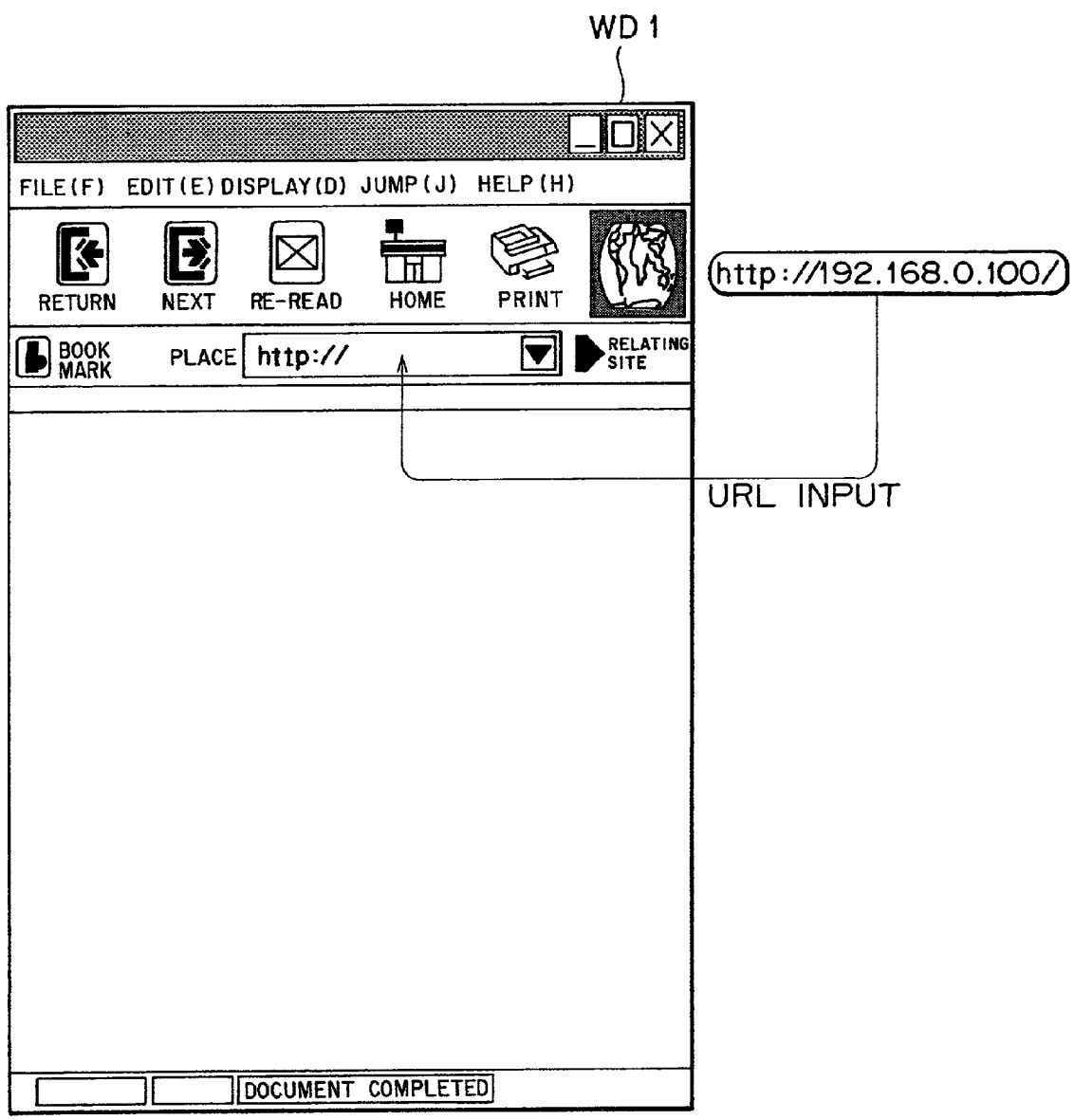
FIG. 15 is a schematic view illustrating inputting operation of a URL on the personal computer side in an operation procedure upon PC connection.

After the web browser is started up in the personal computer apparatus 300, such a browser window WD1 as shown in FIG. 15 is displayed on the monitor screen of the personal computer apparatus 300 as well known in the art.

Then, the user will input the IP address (homepage address) set to the video camera 0 into input boxes for a URL (Uniform Resource Locator) at a tool bar portion of the browser window WD1 and cause the personal computer apparatus 300 to execute accessing to the inputted IP address. Consequently, the personal computer apparatus 300 accesses the video camera 0.

The video camera 0 of the present embodiment can produce a web file of the HTML format and transmit and output the web file using the IP as described hereinabove.

By sending an access request in such a manner as described above, the personal computer apparatus 300 can read in a file of a web page of the HTML format produced by the video camera 0 side. Then, the personal computer apparatus 300 outputs the read web page to the browser window WD1 so that the web page may be displayed in the browser window WD1.

Figure 16:
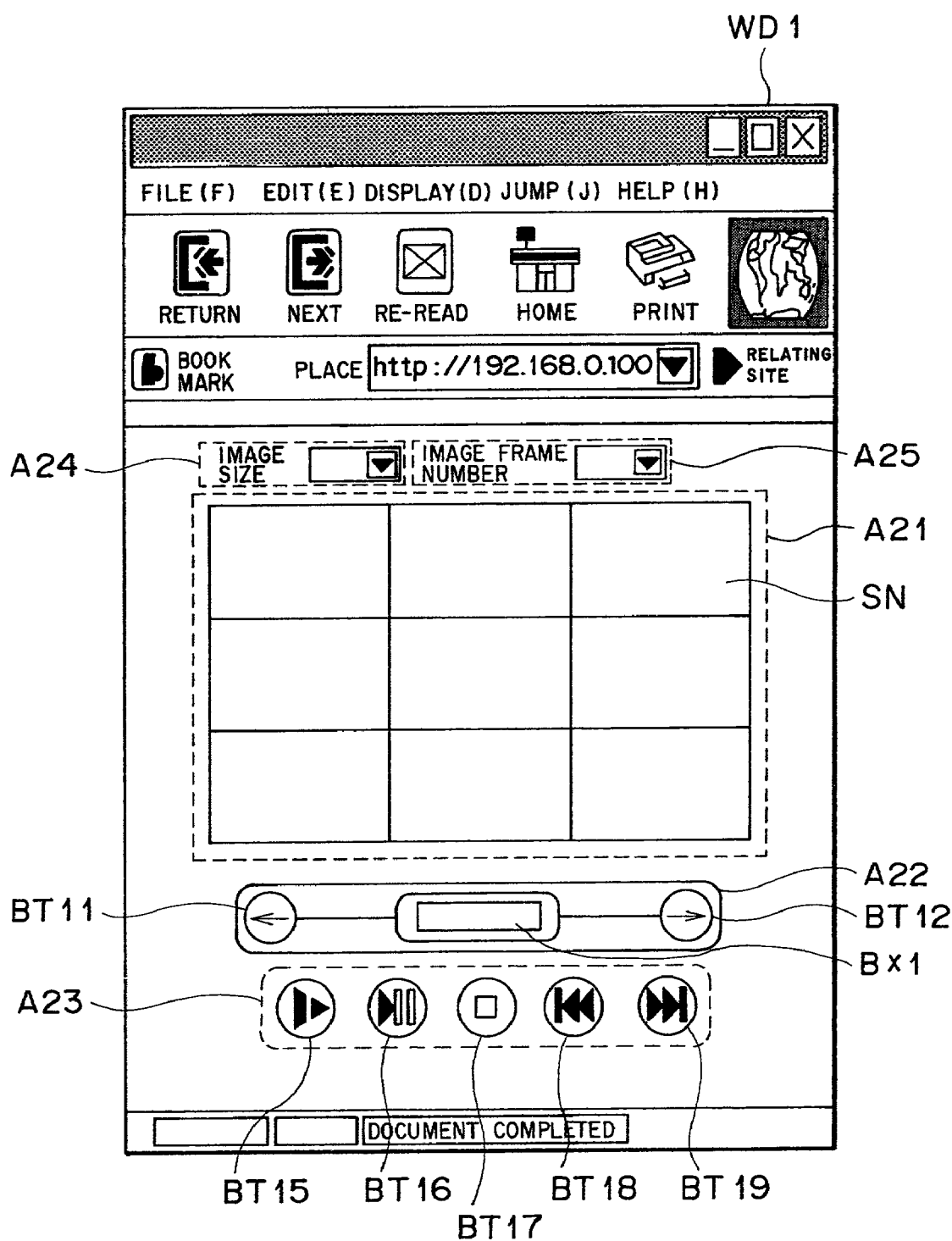
FIG. 16 is a schematic view showing an example of a display of a browser screen (operation screen) displayed on the personal computer side based on information read in from the video camera.

FIG. 16 shows an example of form of display of the top page of the web page displayed in the browser window WD1 at this time, that is, a browser screen.

Referring to FIG. 16, the browser screen shown includes a display of a thumbnail picture display area A21, in which a predetermined number of thumbnail pictures SN are displayed in a predetermined arrangement order in accordance with a file order based on a predetermined sorted order. FIG. 16 shows an example wherein nine thumbnail pictures are displayed.

A page change area A22 is displayed below the thumbnail picture display area A21.

Where the number of thumbnail pictures relating to the number of files recorded on the disk is greater than the number of those thumbnail pictures which can be displayed in the thumbnail picture display area A21, the thumbnail picture display area A21 adopts a page structure. Where the display shown in FIG. 16 is, for example, an initial display, the first page is displayed in the thumbnail picture display area A21. In other words, thumbnail pictures SN for the first nine files in the file order are displayed.

The page change area A22 is used to perform an operation for changing the page in the thumbnail picture display area A21.

In this instance, the page change area A22 has a display of a preceding page button BT11, a next page button BT11 and a jump page input box BX1 arranged therein.

If the user performs a clicking operation to the preceding page button BT11 using an operation element such as, for example, a mouse, then if a page preceding to the page being currently displayed is present, then the display of the thumbnail picture display area A21 is changed over to a display of a page immediately preceding to the page being currently displayed.

Similarly, if the user performs a clicking operation to the next page button BT12, then if a page following a page being currently displayed is present, then the display of the page change area A22 is changed over to a display of a page immediately following the page being currently displayed.

If the user performs a predetermined operation to input a desired page number into the jump page input box BX1 and instruct the personal computer apparatus 300 for execution, then the display of the thumbnail picture display area A21 is changed over to a display of a page of the page number through page jumping.

Then, the user can selectively perform a clicking operation to one of the thumbnail pictures SN displayed in the thumbnail picture display area A21 using a mouse or the like.

After the clicking operation to a thumbnail picture SN is performed, the personal computer apparatus 300 accesses the video camera 0 to request for transmission of a file corresponding to the thumbnail picture SN to which the clicking operation has been performed.

Upon reception of the request, the video camera 0 typically reads out the designated file from a disk, converts the file into a web file of the HTML format and outputs the web file. In this instance, for example, a still picture data file of image data is outputted as a still picture data file of the JPEG format. On the other hand, a moving picture data file of moving picture data is outputted as a file of the Motion JPEG format.

Figure 17:
FIG. 17 is a schematic view showing an example of a display of another browser screen (reproduction image displaying screen) displayed on the personal computer side based on information read in from the video camera.

Here, if the file of an object of the transmission request is a file of still picture data and the personal computer apparatus 300 receives the file of still picture data, then a reproduction image of the received still picture data is displayed on and outputted to the browser screen in the browser window WD1, for example, in such a manner as seen in FIG. 17.

On the other hand, where the received image data are moving picture data, though not shown, software for reproduction of moving pictures of the Motion JPEG format is started up in response to the moving picture data. Thus, the received moving picture data can be browsed by an operation performed to the software for reproduction of moving pictures It is to be noted that, where image data are reproduced and outputted on the browser in such a manner as described above, if also sound data are recorded in synchronism with the image data on the disk, then the video camera side may reproduce and output the sound data so that they may be transmitted together. This makes it possible for the personal computer apparatus 300 side to reproduce and output sound together with reproduction of an image.

The video camera of the present embodiment may possibly reproduce a data file as an interview track on which sound data are recorded principally and incident still picture data are recorded as described hereinabove. Where the interview track is to be reproduced and outputted on the browser, the sound data should be reproduced and outputted while a still picture is reproduced and outputted as seen in FIG. 17.

When image data are reproduced and outputted on the browser in such a manner as described above, the size of an image to be displayed based on the image data can be designated by the user operating to an image size setting area A24 displayed at a position above the thumbnail picture display area A21. Further, the user can perform an operation to an frame number setting area A25 disposed on the right-hand side of the image size setting area A24 to designate the number of frames (number of images) per unit time upon reproduction of moving pictures.

The video camera 0 transmits an image data file in accordance with the image size and the frame number set in the image size setting area A24 and the frame number setting area A25, respectively.

The foregoing description relates to thumbnail picture display on the browser screen and file reproduction outputting operation of the personal computer apparatus 300 side performed in response to an operation to the thumbnail picture display.

In addition, reproduction operation (and recording operation) of the video camera 0 of the present embodiment can be remotely controlled by an operation to the browser screen in the following manner.

An operation button area A23 is disposed on a page of the browser screen shown in FIG. 16. In this instance, the operation button area A23 includes a display of buttons relating to reproduction operation including a slow reproduction button BT15, a reproduction/pause button BT16, a stop button BT17, and a pair of AMS (head search) buttons BT18 and BT19.

Here, it is assumed that, as an example of an operation to the operation button area A23, the user operates the reproduction/pause button BT16 while reproduction operation of the video camera 0 stops.

In response to the operation, the personal computer apparatus 300 outputs operation information representing that the reproduction/pause button BT16 is operated to the video camera 0.

The video camera 0 receives the operation information and recognizes from the contents of the operation information that an instruction for temporary stopping of reproduction is issued. Then, the video camera 0 starts reproduction of an image data file recorded on the disk. The file reproduced in this manner is outputted, for example, to the display unit 6A of the video camera 0 so that it may be displayed on the display unit 6A. If the video output terminal of the video camera 0 and a monitor apparatus are connected to each other, then a reproduced image is displayed on the monitor apparatus.

Further, the video camera 0 transmits the reproduced image data file to the personal computer apparatus 300 so that the image data file may be reproduced and outputted on the browser as described hereinabove.

It is to be noted that the buttons to be displayed in the operation button area A23 described above are not limited to the specific ones shown in FIG. 16 and can be suitably modified in accordance with actual specifications and so forth. For example, while an operation button for recording is not provided in the operation button area A23, a recording button, for example, for starting recording may be provided.

The system operation described above applies to the system configuration shown in FIG. 13A or 13B as described hereinabove. The system operation can be realized readily if the apparatus with which the video camera 0 communicates is a personal computer apparatus as seen in FIG. 13A or 13B.

However, the system operation described above can be applied also to another configuration wherein two such video cameras 0 are connected directly to each other as seen in FIG. 13C.

In particular, as a configuration for communication, the external interface 8 is configured so as to allow mutual communication between video cameras using the IP. Further, a program as browser software for processing a file of the HTML format and reproducing and outputting resulting data is stored in advance typically in the program memory 39 of each of the video cameras.

In the configuration just described, if one of the video cameras serves as a server and transmits a file of the HTML format, then the other video camera which serves as a client can display a page screen on a browser in such a manner as seen, for example, in FIG. 16 or 17. Further, the video camera can reproduce and output an image data file.

Processing of the video camera side for realizing the system operation described above is described below with reference to processes of FIGS. 19, 20, 21 and 22.

It is to be noted that the processes illustrated in those figures are realized by execution of control processing by the data processing/system control circuit 31, driver controller 46 and so forth when necessary while the video controller 38 functions as a master controller. Since the data processing/system control circuit 31 and the driver controller 46 execute control processing under the control of control signals of the video controller 38, the following processes of the flowcharts are described as processes of the video controller 38.

Figure 19:
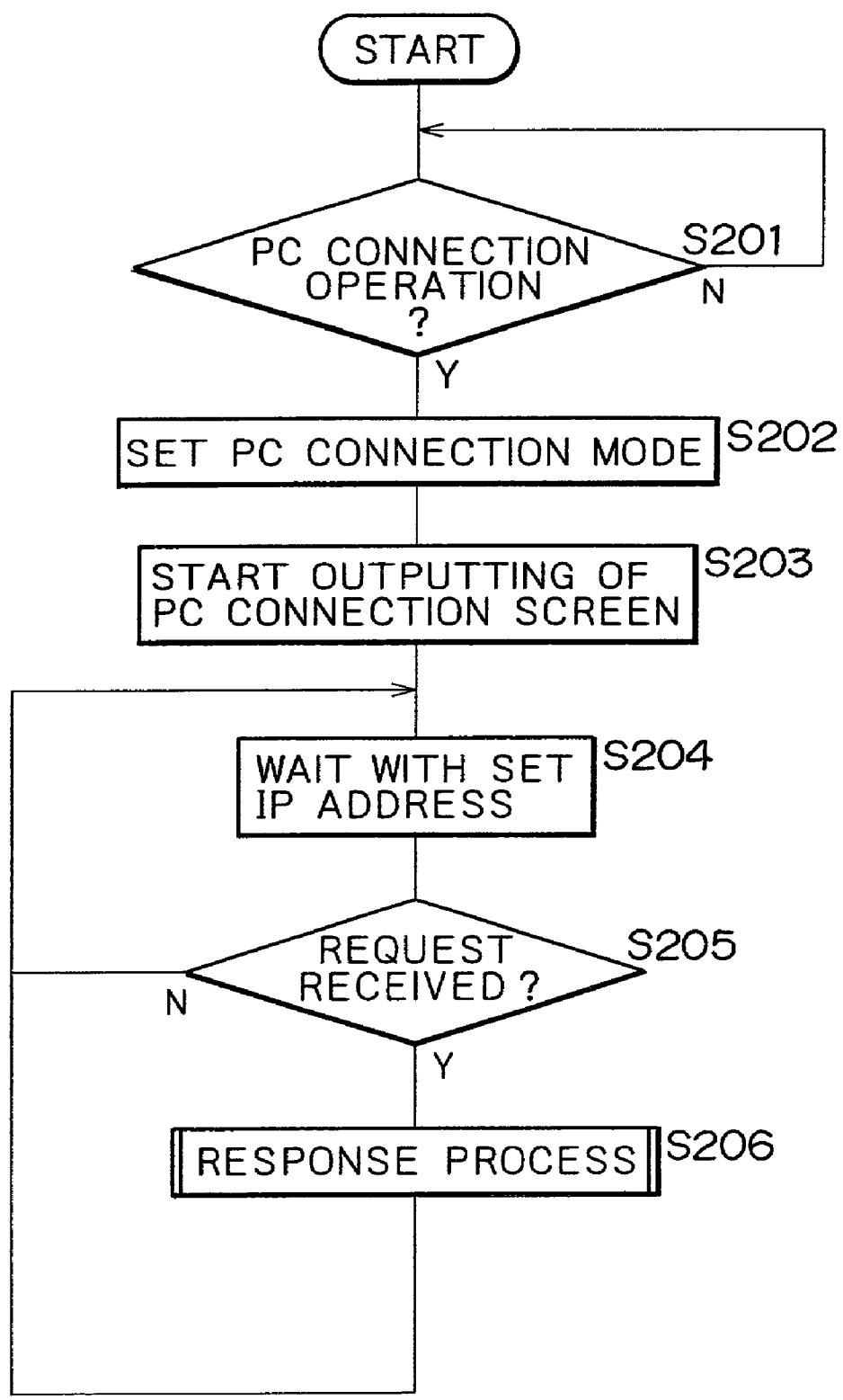
FIG. 19 is a flowchart illustrating system operation of the video camera where the video camera and a personal computer are connected to each other.

FIG. 19 illustrates a process for establishing a connection to the personal computer apparatus 300 and a normal process during such connection.

Referring to FIG. 19, first in step S201, the video controller 38 waits that a PC connection operation is performed. In particular, the video controller 38 waits that an operation of selectively deciding the item of "Connection" of the second popup menu described hereinabove with reference to FIG. 14A is performed.

If it is discriminated in step S201 that a PC connection operation is performed, then the video controller 38 advances its processing to step S202, in which it sets a PC connection mode. Consequently, processing in the PC connection mode is executed in step S203 et seq.

In step S203, the video controller 38 executes a control process to cause the display unit 6A to start display of the PC connection screen shown in FIG. 14C. In this instance, the video controller 38 refers to the IP address set by the processing described hereinabove with reference to FIG. 18 and produces display data so that the IP address may be displayed as a "set homepage address" in the PC connection screen.

In next step S204, the video controller 38 waits for accessing with the IP address set by the processing illustrated in FIG. 18. In particular, the video controller 38 establishes an operation state wherein communication with an external apparatus through an ethernet is possible. Then, by the processing in step S204 and processing in next step S205, the video controller 38 waits for reception of a request through the ethernet in the waiting state.

If it is discriminated in step S205 that a request is received, then the video controller 38 advances its processing to step S206, in which it executes a responding process to the request. It is to be noted that an example of the responding process is hereinafter described. After the responding process is completed, the video controller 38 returns its processing to step S204.

Though not illustrated in FIG. 19, if the disconnection button BT3 of the PC connection screen shown in FIG. 14C is operated by the user while the process illustrated in FIG. 19 is being executed, then the video controller 38 cancels the PC connection mode which has been set till then and then quits the present routine. In this instance, the video controller 38 erases the display of the PC connection screen and restores the normal operation screen.

Now, an actual example of the processing in step S206 illustrated in FIG. 19 is described.

First, if the user of the personal computer apparatus 300 inputs the IP address of the video camera and executes accessing to the IP address as described hereinabove with reference to FIG. 15, then the personal computer apparatus 300 transmits a homepage access request to the video camera 0. The operation in step S206 when the video controller 38 receives the homepage access request is such as illustrated in FIG. 20.

Figure 20:
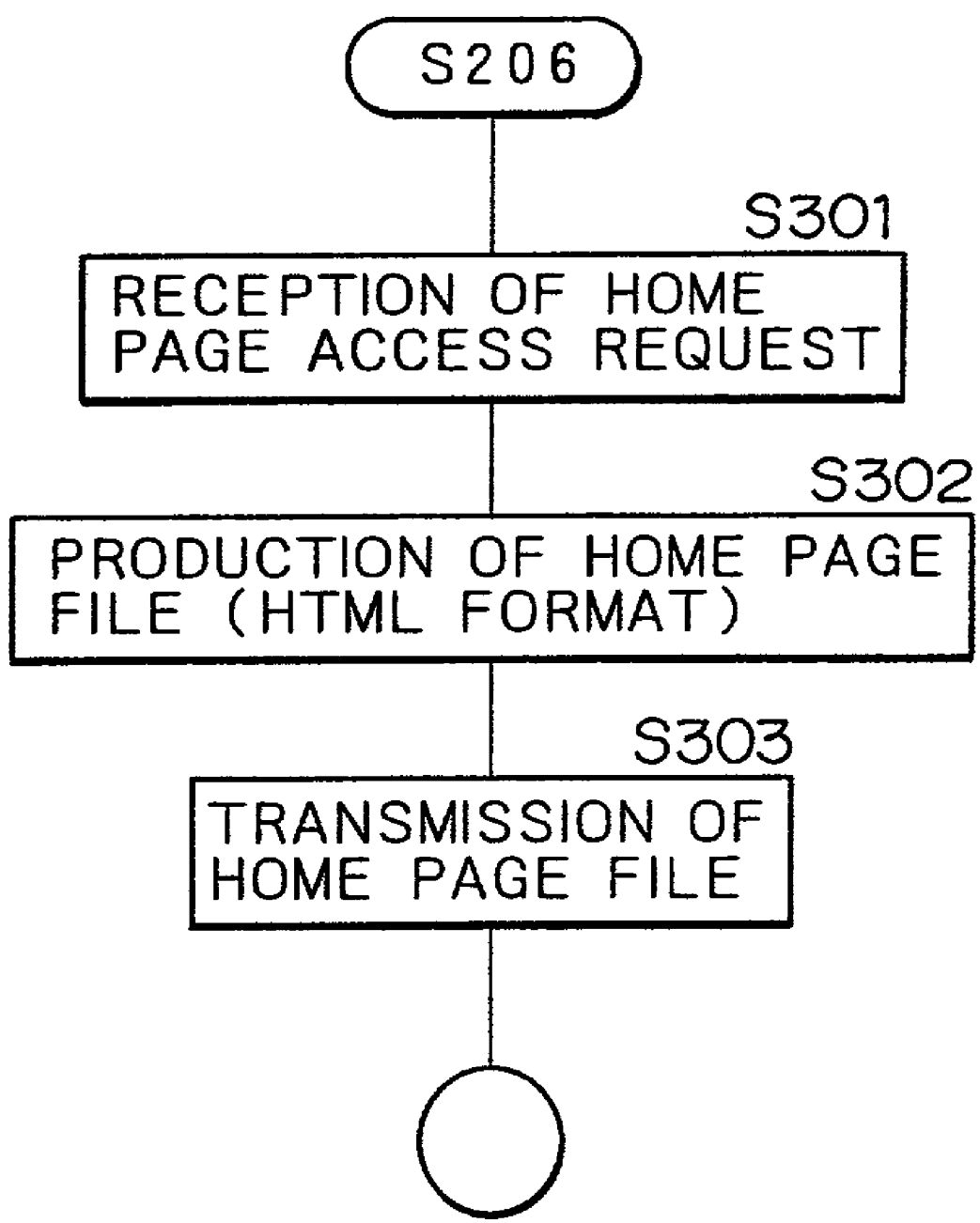
FIG. 20 is a flowchart illustrating processing operation for transmission of a homepage file as an example of a responding process to the process illustrated in FIG. 19.

Referring to FIG. 20, the video controller 38 recognizes in step S301 that the homepage access request is received. In response to the request, a homepage file is produced under the control of the video controller 38 in step S302. In particular, an HTML contents file which conforms with display contents of the browser screen shown in FIG. 16 is produced making use of thumbnail picture data recorded on the disk.

Then in next step S303, the video controller 38 transmits the homepage file produced in step S302 to the personal computer apparatus 300.

The personal computer apparatus 300 reads in the homepage file transmitted thereto and processes the homepage file on the browser. Consequently, the browser screen shown in FIG. 16 is displayed and outputted.

On the other hand, if a clicking operation to a thumbnail picture SN displayed on the browser screen of FIG. 16 is performed by the user, then a file data request with a file designated is transmitted from the personal computer apparatus 300 to the video camera 0.

Figure 21:
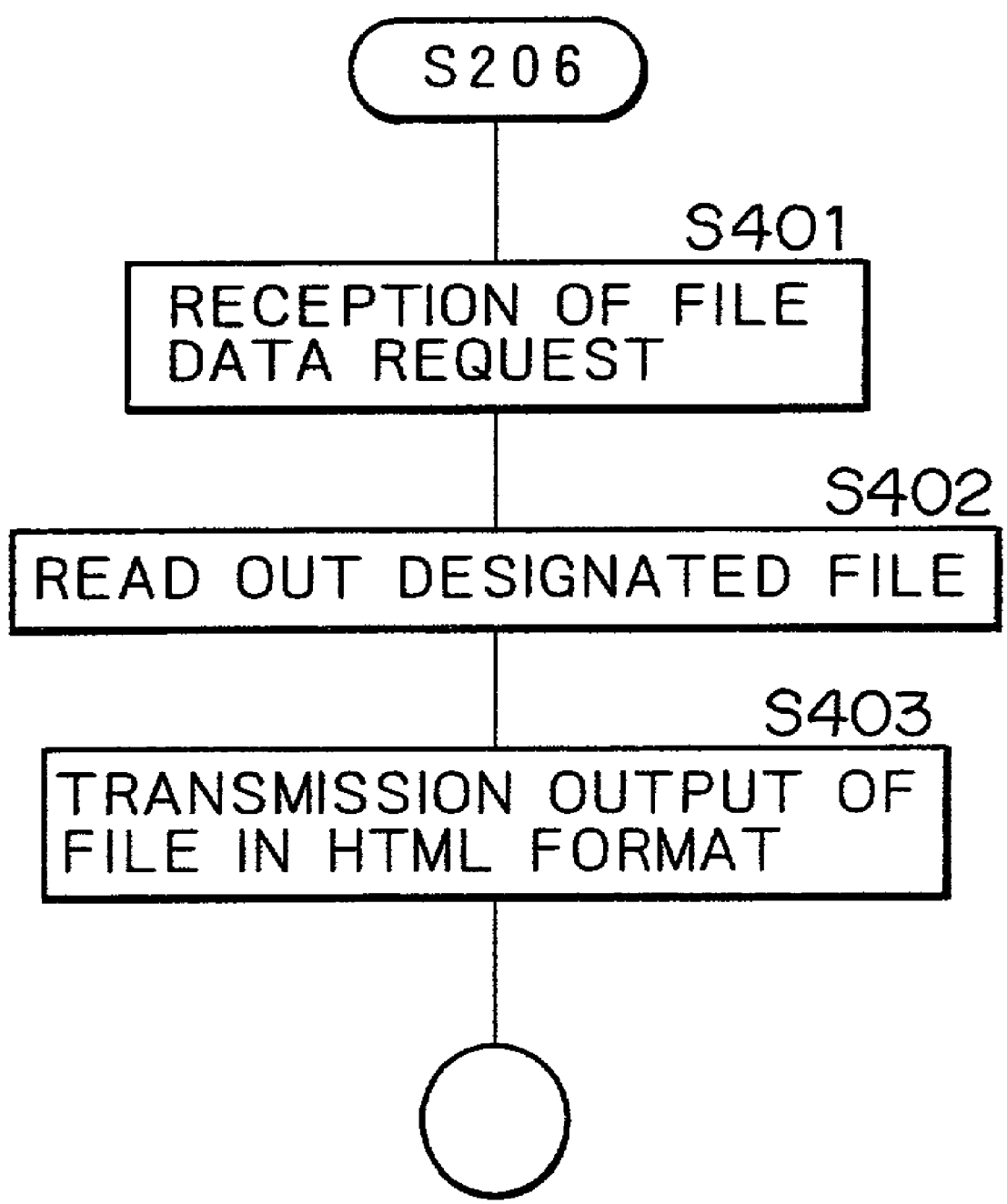
FIG. 21 is a flowchart illustrating processing operation for transmission of designated reproduction image data as an example of a responding process to the process illustrated in FIG. 19.

The responding processing in step S206 when the file data request is received by the video controller 38 is such as illustrated in FIG. 21.

Referring to FIG. 21, the video controller 38 recognizes reception of the file data request first in step S401. In response to the file data request, the video controller 38 reads out a data file designated by the file data request from the disk in step S402. Then, the video controller 38 outputs the read out data as data of the HTML file format. For example, if the read out data are image data, then the video controller 38 executes processing for outputting the image data as a still picture file of the JPEG format as described hereinabove.

Further, if a clicking operation is performed to one of the buttons displayed in the operation button area A23 of the browser screen of FIG. 16, then operation information corresponding to the button of the object of the clicking operation is transmitted as request information to the video controller 38.

Figure 22:
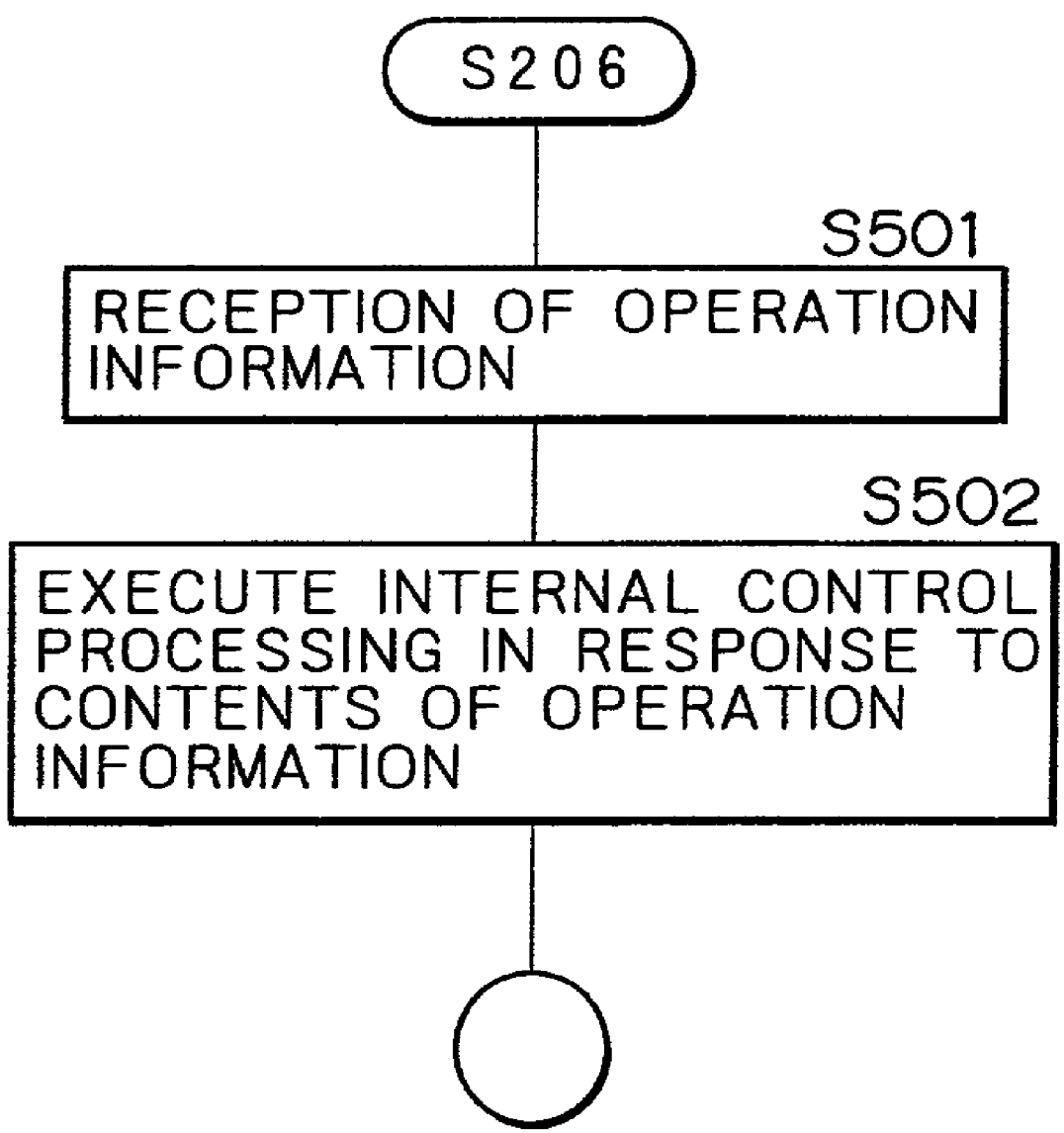
FIG. 22 is a flowchart illustrating processing operation performed in response to reception of operation information as an example of a responding process to the process shown in FIG. 19.

The responding process in step S206b when the video controller 38 receives the operation information is such as illustrated in FIG. 22.

Referring to FIG. 22, the video controller 38 recognizes reception of the operation information in step S501. In next step S502, the video controller 38 discriminates it from contents of the received operation information what control processing should be executed in the inside thereof, and executes required internal control processing based on a result of the discrimination.

For example, if the reproduction/pause button BT16 is operated as described as an example above, then operation information representing that the reproduction/pause button BT16 is operated is received by the video camera side. The video controller 38 discriminates from the operation information that starting of reproduction or pause or temporary stopping should be executed. Then, if the operation state of the video camera at present is a reproduction stopping state, then the video controller 38 executes control processing for starting playback of the disk. However, if the operation state of the video camera at present is a reproduction operation, then the video controller 38 executes control processing for temporarily stopping the reproduction.

9-2-3. Example (2) of the System Operation

Here, communication between a pair of video cameras is considered. More particularly, communication where a pair of video cameras are connected directly to each other by an ethernet or a data interface different from an ethernet interface such as, for example, an IEEE 1394 interface as shown in FIG. 13C is considered. Or else, communication between a pair of video cameras connected to ether other by a transmission line of a LAN in a system like the system shown in FIG. 13B is considered.

In this instance, the system is constructed such that a pair of video cameras communicate with each other as described hereinabove so that operation similar to the system operation described hereinabove may be achieved. In particular, one of the video cameras which serves as a server transmits thumbnail picture data recorded on a disk to the other video camera which serves as a client. Then, the video camera serving as the client makes use of the received thumbnail picture data to present a thumbnail display of the thumbnail picture data. Further, in response to a designation operation performed for a thumbnail picture on the thumbnail display, the server side video camera transmits image/sound data corresponding to the designated thumbnail picture. For example, in this instance, the client side video camera may reproduce and output the image data transmitted thereto. Alternatively, however, the client side video camera may record the image data onto a disk.

If it is tried to use two video cameras to achieve the system operation described hereinabove, then the system may possibly assume the following configuration.

The video cameras have a similar internal configuration and can each output such an operation screen which includes a thumbnail display as described with reference to FIG. 11.

In this instance, data may be communicated in the HTML format. However, from the reason described hereinabove, data need not necessarily be transmitted in the HTML format, and the load to the video camera serving as a server is lighter where only thumbnail picture data are transmitted in a predetermined data file format. Also where it is considered to reproduce and output a transmitted thumbnail picture using the video camera serving as a client, the transmitted thumbnail picture data may be utilized to produce image data for the operation screen (thumbnail picture display) shown in FIG. 11. Therefore, the necessity for provision of a web browser is eliminated, and the load by the processing is reduced as much.

Where the system configurations shown in FIGS. 13A to 13C are examined synthetically, a video camera either communicates with a personal computer apparatus or communicates with another video camera.

Therefore, when a request for data transmission is received from the outside, if the apparatus which has issued the request is a personal computer apparatus, then the video camera transmits data using the HTML format as described hereinabove. However, if the apparatus which has issued the request is another video camera apparatus, then the video camera does not perform conversion of data into data of the HTML format but transmits only a data file in a predetermined data format. In other words, the format of data to be transmitted is changed in accordance with the type of an apparatus which has issued a data request.

Figure 23:
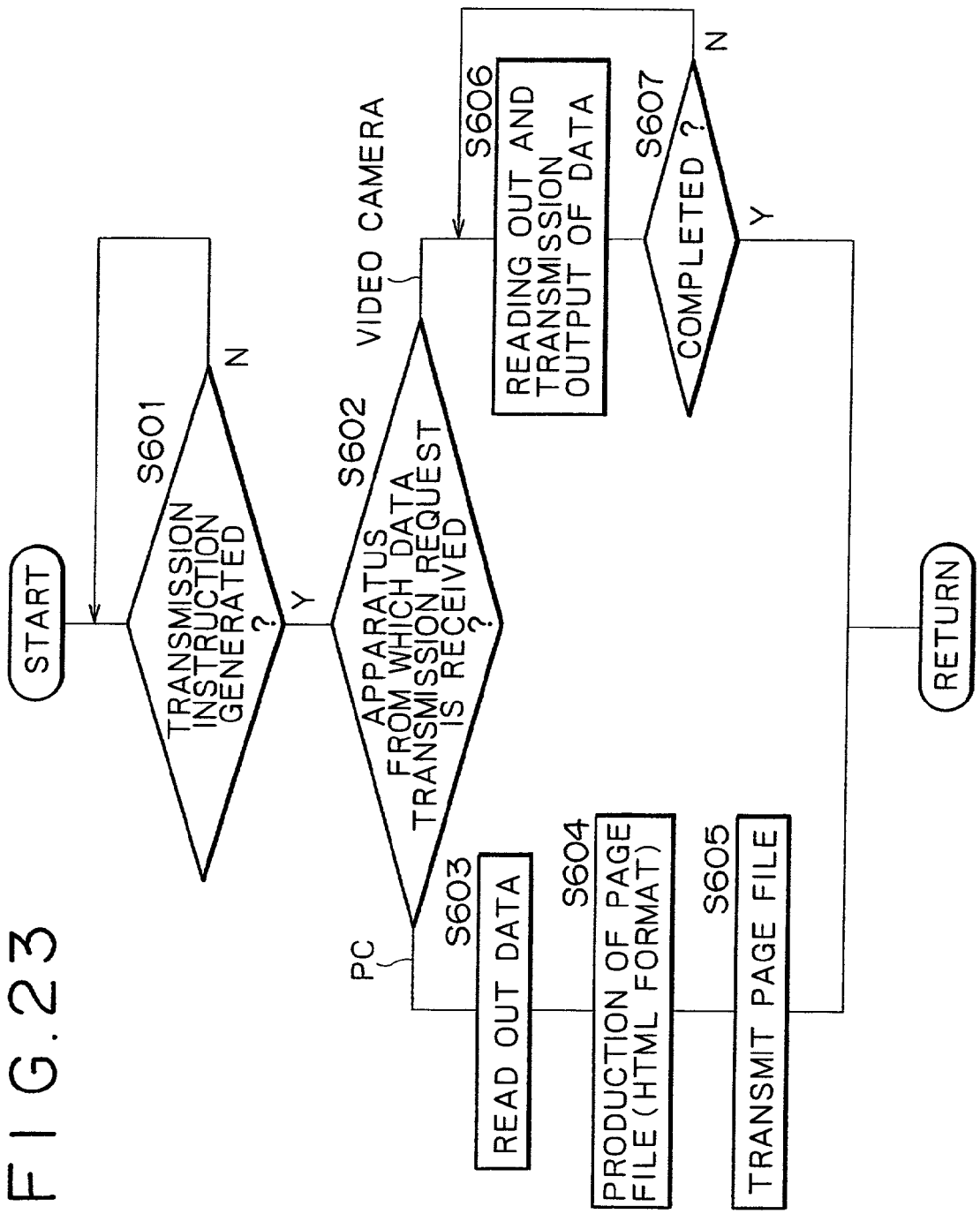
FIG. 23 is a flowchart illustrating processing operation for changing the format of image data in response to an external apparatus which has issued a transmission request and transmitting and outputting the image data of the changed format.

FIG. 23 illustrates processing operation executed by the video camera apparatus side serving as a server for realizing the system operation described above. Also this processing is realized by the video controller 38 functioning as a master controller and the data processing/system control circuit 31, driver controller 46 and so forth executing control processing suitably. Since the data processing/system control circuit 31 and the driver controller 46 execute the control processing under the control of control signals of the video controller 38, the following processing of the flowchart is described as processing of the video controller 38.

Further, as a system configuration where this processing is executed, either one of a personal computer apparatus and a video camera or both of a personal computer apparatus and a video camera are connected to a video camera serving as a server.

Where a personal computer apparatus and a video camera are connected to the video camera serving as a server in this manner, the video camera serving as a server and the personal computer apparatus are connected by an ethernet. However, for connection between the two video cameras, an ethernet may be used similarly for a personal computer apparatus or a data interface such as the IEEE 1394 interface may be used without using an ethernet.

Referring to FIG. 23, the video controller 38 waits first in step S601 that a data transmission instruction is issued. The data transmission instruction here is transmission instruction information generated typically by the video controller 38 in response to reception of a data transmission request transmitted from an external apparatus through an ethernet or a data interface.

If it is discriminated in step S601 that a data transmission instruction is issued, then in next step S602, the video controller 38 discriminates the type of an apparatus which has issued the data transmission request. In order to perform the discrimination, the video controller 38 may typically refer to identification information, from which the type of the apparatus can be specified, transmitted together with the data transmission request.

If it is discriminated in step S602 that the apparatus which has issued the data transmission request is a personal computer apparatus, then the video controller 38 advances its processing to step S603.

In step S603, the video controller 38 executes control processing for reading out required data necessary for production of a homepage file typically from a disk. If it is necessary to produce, for example, a homepage file as such a page screen as shown in FIG. 16, then the video controller 38 reads out thumbnail picture data from the disk. On the other hand, in order to reproduce and output such image data as seen in FIG. 17 or reproduce and output sound data of an interview track or a like track, the video controller 38 reads out a designated image data file or sound data file from the disk.

Then in next step S604, the video controller 38 makes use of the data read out from the disk in such a manner as described above to produce a page file of the HTML format, that is, an HTML contents file.

Then in step S605, the video controller 38 transmits the page file produced in this manner to the personal computer apparatus which has issued the data transmission request.

On the other hand, if it is discriminated in step S602 that the apparatus which has issued the data transmission request is a video camera, then the video controller 38 advances its processing to step S606.

In step S606, the video controller 38 executes control processing for reading out a required data file in accordance with the data transmission request and transmitting and outputting the read out data file to the video camera which has issued the data transmission request. In other words, the video controller 38 does not perform conversion of the format into the HTML format but transmits and outputs data read out from the disk as they are in a data format obtained as a result of ordinary reproduction processing for the data. For example, if the data read out from the disk are thumbnail picture data, then they are outputted as they are keeping the image data format normally obtained from a disk. If the data are still picture data, then they are transmitted and outputted while they remain in a JPEG data file. If the data are moving picture data, then they are transmitted and outputted in a format of data compressed typically in accordance with the MPEG2 system without conversion of the format into the Motion JPEG format.

The processing in step S606 described above is repeated until the video controller 38 discriminates in next step S607 that the transmission of all of the data to be transmitted is completed. If it is discriminated in step S607 that the data transmission is completed, then the processing of the video controller 38 returns typically to the main routine.

The system operation is such as described above. Subsequently, another example of system operation which may be performed in such a system wherein the personal computer apparatus 300 and the video camera 0 can communicate with each other as shown in FIG. 13A or 13B is described complementarily.

In recent years, it is frequently a practice to utilize the Internet in order to proceed typically with version-up of functions or correction of bugs of software for personal computer apparatus. For example, a maker uploads up data for version-up into a web site of the maker itself on the Internet. A user can access the web site to download the up data and achieve version-up of the software and so forth with the downloaded up data.

Therefore, based on such a technique as just described, it is a possible idea to utilize the Internet in order to proceed with version-up of functions or correction of bugs of the video camera 0 of the present embodiment. In this instance, up data may be provided to a user of the video camera and version-up may be performed by the user side in the following procedure.

A maker which manufactures the video camera 0 uploads up data for the video camera typically on a web site of the maker itself.

The user of the video camera 0 connects the personal computer apparatus 300 to the Internet and accesses the web site of the maker to download the up data for the video camera. The file of the downloaded up data is stored typically onto a hard disk which is a storage apparatus of the personal computer apparatus 300. The user thus acquires the up data from the web side.

Then, the user thereafter connects the video camera 0 and the personal computer apparatus 300 owned by the user itself typically in such a manner as seen in FIG. 13A or 13B.

Here, it is assumed that the video camera 0 of the present embodiment can set an "update mode" for updating a program of the system with the up data described above. Further, the user of the video camera 0 sets the "update mode" by predetermined operation. Where the "update mode" is set, the video camera 0 can communicate with the personal computer apparatus 300 and receive the up data transmitted thereto from the personal computer apparatus 300. Further, the user loads a disk into the video camera 0.

After the mode of the video camera 0 is set to the "update mode" in such a manner as described above, the user performs a predetermined operation to the personal computer apparatus 300 to designate the video camera 0 as a destination of transmission. Consequently, the up data file stored on the hard disk is transmitted and outputted to the video camera 0.

The video camera 0 receives the up data file transmitted thereto. The received up data file is written once onto the disk.

In short, rewriting of the program is not performed immediately with the received up data file, but the received up data file is written once onto and stored on the disk intentionally.

If it is assumed otherwise such that rewriting of the program is performed immediately with the received up data file, then if some fault such as interruption of communication with the personal computer apparatus 300 should occur, then the data of the program may be destroyed and the system of the video camera may not regularly operate thereafter.

However, where a received up data file is recorded once onto a disk in such a manner as described above, even if some fault occurs with communication, the currently applied program itself is not destroyed. Further, recording onto the disk can be re-tried so that the up data file may be recorded correctly.

Further, if data checking regarding continuity of data or the error rate is performed upon writing of the up data file onto the disk, then it can be discriminated whether or not the up data file to be written onto the disk is normal. This further raises the safety.

Further, it may be better to include authentication information, which indicates that the data have been produced and distributed regularly by their maker, into the up data file and perform, when the up data file is received by the video camera 0, based on the authentication information of the up data file, whether or not authentication is obtained. Then, only if authentication is obtained with regard to the up data file, the up data file is recorded onto the disk, but any up data file for which authentication cannot be obtained is rejected from reception and is not written onto the disk.

The countermeasure just described disables rewriting of a program typically with an up data file produced or copied illegally and received and acquired on the video camera 0 side. In other words, illegal use of the up data file can be prevented.

Then, if the writing of the up data file onto the disk on the video camera 0 side is completed regularly in such a manner as described above, then the user will perform a predetermined operation to execute updating of the program.

In response to the operation, the video camera 0 reads out the up data file from the disk and rewrites the program memory stored in the program memory 39 with the up data file. If the rewriting is completed appropriately, the updating of the program is completed thereby.

Figure 24:
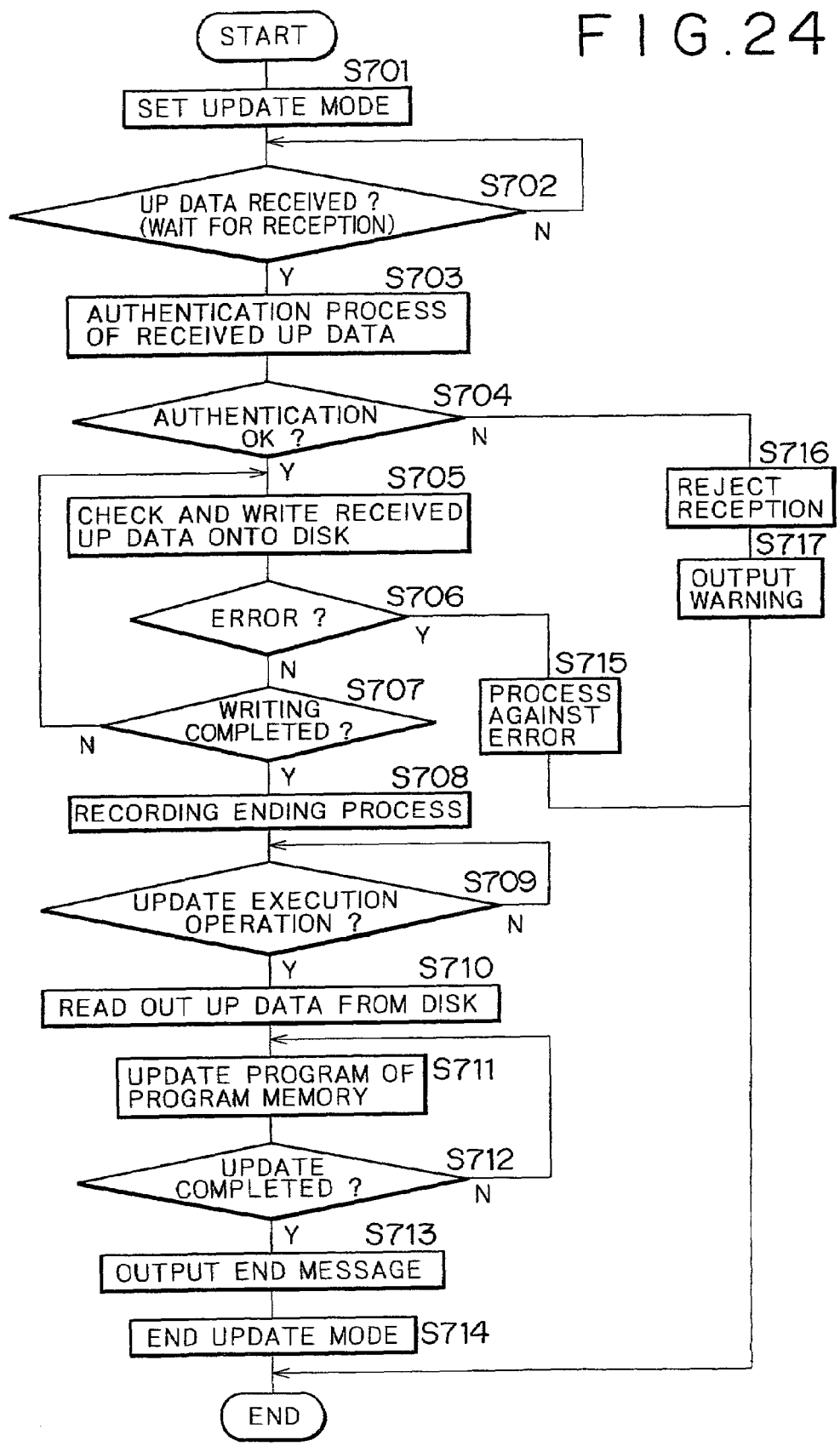
FIG. 24 is a flowchart illustrating processing operation for updating a program of the video camera.

The flowchart of FIG. 24 illustrates the processing operation of the video camera 0 in the update mode described above. Also the process illustrated in FIG. 24 is realized by the video controller 38 functioning as a master controller and the data processing/system control circuit 31, driver controller 46 and so forth executing required control processes. Since the data processing/system control circuit 31 and the driver controller 46 execute the control processes under control signals of the video controller 38, the following process of the flowchart of FIG. 24 is described as processing of the video controller 38.

If it is assumed that an operation for setting the update mode is performed in such a manner as described above, then the video controller 38 enters the routine illustrated in FIG. 24 and first sets an update mode in step S701.

After the video controller 38 sets the update mode, it advances its processing to step S702. In step S702, the video controller 38 waits that an up data file transmitted as a result of accessing from the personal computer apparatus 300 is received by the external interface 8. After the up data file is received, the video controller 38 advances its processing to step S703.

In step S703, the video controller 38 performs an authentication process for the received up data file. In particular, the video controller 38 discriminates based on authentication information or information of a copy status or the like inserted in the up data whether or not the received up data file is legal. Then, based on a result of the discrimination, the video controller 38 discriminates in next step S704 whether or not authentication is satisfied.

If a discrimination result that authentication is not satisfied is obtained in step S704, then the video controller 38 advances its processing to step S716, in which the video controller 38 rejects reception of the up data file. In other words, the video controller 38 executes control processing so that the external interface 8 may stop reception of the up data file. Then, the video controller 38 advances its processing to next step S717, in which a warning is outputted. Typically, the video controller 38 controls the display unit 6A to display predetermined display contents so as to notify the user that the received data are not legal.

On the other hand, if another discrimination result that authentication is satisfied is obtained in step S704, then the video controller 38 advances its processing to step S705.

In step S705, the video controller 38 performs required data checking such as checking of the continuity of the data or the error rate and executes control processing for recording the received and thus acquired up data file onto a disk.

While such writing of the up data file is proceeding, the video controller 38 discriminates in next step S706 whether or not an error is detected as a result of the data checking. Here, if a discrimination result that an error is detected is obtained, then the video controller 38 advances its processing to step S715, in which it takes a countermeasure against the error.

In the countermeasure against the error in step S715, typically the video controller 38 first stops the writing operation of the up data file onto the disk. Then, the video controller 38 controls the display unit 6A to indicate in a predetermined display form that the writing onto the disk has resulted in failure.

If it is discriminated in step S706 that no error is detected, then the video controller 38 discriminates in next step S707 whether or not the writing of the up data file onto the disk is completed. If it is discriminated that the writing is not completed as yet, then the video controller 38 returns its processing to step S705 so that the video controller 38 continues the writing of the up data file onto the disk.

On the other hand, if it is discriminated in step S707 that the writing of the up data file onto the disk is completed, then the video controller 38 advances its processing to step S708, in which it executes a recording ending process. In particular, the video controller 38 stops the recording operation onto the disk and executes required control processing for ending the recording such as to update the RTOC so that the up data are managed as recorded on the disk.

After the processing in step S708 is completed, the video controller 38 waits in step S709 that an update execution operation by a predetermined operation of a user is performed. If such an update execution operation as just mentioned is performed, then the video controller 38 advances its processing to step S710.

In step S710, the video controller 38 executes an update process. In particular, the video controller 38 reads out the up data file recorded on the disk. Then in next step S711, the video controller 38 rewrites the program data recorded in the program memory 39 with the read out up data file.

The update process in step S711 is continued until it is discriminated in next step S712 that the update process comes to an end. After the update process comes to an end, the video controller 38 advances its processing to step S713.

In step S713, the video controller 38 controls the display unit 6A to display a message representing that the updating is completed. Then in next step S714, the video controller 38 ends the update mode which has been set till then and then quits the present routine.

It is to be noted that it has been described above that the operation of receiving and recording an up data file onto a disk and updating of a program with the up data file recorded on the disk are executed successively in the same update mode. However, it is alternatively possible, for example, to cancel the update mode when recording of the up data file onto the disk is completed, load the disk on which the up data file is recorded into the video camera 0 and set the update mode again, and then execute an update execution operation. In this instance, updating can be performed in any desired opportunity.

It is to be noted that the present invention is not limited to the specific configuration of the embodiment described above but allows various modifications. For example, while the video camera can be connected to an external apparatus such as a personal computer apparatus utilizing an ethernet, a different interface may be adopted. Incidentally, also for the communication protocol, a communication protocol other than the IP may be adopted. Further, also it is possible to produce and send out a page screen in a format of contents information other than the HTML such as, for example, the XML. Also the form of the page screen as contents information prepared by the video camera side is not limited, for example, to that described hereinabove with reference to FIG. 15.

The present invention can be applied also to apparatus other than such a video camera apparatus described hereinabove as the preferred embodiment thereof. In particular, the present invention can be applied to any video apparatus which can reproduce an image in addition to a video camera. Also the recording medium from which an image is reproduced is not limited to a disk, and the present invention can be applied also to such video apparatus in which a recording medium in the form of a memory element such as, for example, a flash memory is used.

As can be seen from the foregoing description, in a recording and/or reproduction apparatus according to the present invention, an external information processing apparatus (personal computer apparatus) has information (page screen information) of an operation screen of a format for display and can be transmitted. Then, in response to an operation performed to the operation screen displayed on the external information processing apparatus, the recording and/or reproduction apparatus can execute control processing regarding recording or reproduction. In other words, an operation of the recording and/or reproduction apparatus regarding recording or reproduction including starting or stopping of a reproduction operation or a recording operation can be controlled by an operation to the operation screen of the external information processing apparatus.

Generally, in order to realize such an operation to a recording or reproduction apparatus from an external information processing apparatus, application software for exclusive use for operating the recording or reproduction apparatus must be installed into the external information processing apparatus. In contrast, according to the present invention, information for the operation screen is prepared on the video camera side and transmitted to the external information processing apparatus. Therefore, such application software as described above is not required, and consequently, a system wherein the recording or reproduction apparatus can be controlled from the external information processing apparatus can be constructed simply and readily as much.

Further, where the recording and/or reproduction apparatus according to the present invention is constructed such that it can be connected to the external information processing apparatus by a predetermined network which is used for connection by the external information apparatus, a network which is used widely for construction of a LAN at present and is high in universality such as, for example, an ethernet which adopts the IP as a communication protocol can be utilized. Therefore, the object of the construction of a simple system can be realized more readily.

The information of the operation screen prepared, transmitted and outputted by the recording and/or reproduction apparatus of the present invention is multimedia contents information of a format with which the information can be processed by terminals of the network described above. More particularly, where an ethernet which is based on the IP or the like is employed, the information of the operation screen is information of an operation screen of the HTML format.

Application software of a browser for outputting a file of the HTML format is frequently preinstalled in personal computer apparatus at present, and even if such application software is not preinstalled in a personal computer apparatus, it can be acquired and installed into the personal computer apparatus readily. Accordingly, the facility of the system construction is raised also in this regard.

The recording and/or reproduction apparatus of the present invention can change, when it transmits image data recorded on a recording medium to an external apparatus, the format of the data in response to a type of the external apparatus which has issued a transmission request for the image data. This allows image data to be transmitted in a format with which the image data can be processed most reasonably for each type of external apparatus. Consequently, the convenience of the system is augmented.

If the external apparatus which has issued the transmission request for image data is a personal computer apparatus, then the image data may be transmitted as data of a format of multimedia contents such as, for example, the HTML format. This allows the personal computer apparatus to output image data transmitted thereto simply and readily by starting up application software for use to output a file of the HTML format. Such application software for outputting a file typically of the HTML format can be acquired and installed readily as described hereinabove.

On the other hand, where the external apparatus which has issued the transmission request for image data is an image recording and/or reproduction apparatus which can record or reproduce an image, the recording and/or reproduction apparatus need not convert image data into image data of a format of multimedia contents but may output the image data as they are while they remain in a predetermined data format (such as, for example, the MPEG format) which is obtained typically in a signal processing procedure when the data were recorded onto a recording medium.

In this instance, the reproduction apparatus of the present invention may eliminate the process for converting data into data of a format of multimedia contents. Further, the image recording and/or reproduction apparatus which receives the image data can execute such processing as outputting or recording the received image data readily only if it includes a circuit which can process data of the data format transmitted thereto. The configuration described is particularly effective where the reproduction apparatus of the present invention which serves as a transmission side apparatus and the image recording and reproduction apparatus which serves as a reception side apparatus are of the same type because image data can be communicate between them without any trouble.

Further, while the present embodiment is formed as a video camera which uses a magneto-optical disk compliant with the MD-DATA2 as a storage medium, the storage medium is not limited to the specific disk, but may be a hard disk, or a semiconductor memory such as a memory stick (trademark), an SD memory card (trademark), a compact flash (trademark), a smart media (trademark), a multimedia card (trademark), a microdrive (trademark), an ID format (trademark) or a ThumbDrive (trademark).

What is claimed is:

1. A recording and/or reproduction apparatus for recording and/or reproducing data onto and/or from a storage medium, comprising:
    recording and/or reproduction means for recording and/or reproducing data onto and/or from the storage medium;
    communication means for communicating with an external apparatus;
    producing means for producing markup language format information for an operation screen including an area for displaying data stored in said storage medium;
    transmission control means for controlling said communication means to transmit the markup language format information for the operation screen to the external apparatus; and
    control means for controlling said recording and/or reproduction means in accordance with the operation screen displayed on the external apparatus when said communication means receives the information for the operation screen.

2. The recording and/or reproduction apparatus according to claim 1, wherein said communication means is capable of communicating with the external apparatus through a network using a predetermined communication protocol.

3. The recording and/or reproduction apparatus according to claim 2, wherein said communication means is capable of communicating with the external apparatus through the network using an internal protocol.

4. The recording and/or reproduction apparatus according to claim 3, wherein said communication means is capable of communicating with a personal computer through the network using an internet protocol.

5. The recording and/or reproduction apparatus according to claim 1, wherein said producing means stores graphical user interface information to be used to remotely control said recording and/or reproduction means from the external apparatus.

6. The recording and/or reproduction apparatus according to claim 5, wherein said producing means stores the graphical user interface information of one or more of a reproduction instruction button, a recording instruction button and a reproduction stop button.

7. The recording and/or reproduction apparatus according to claim 1, further comprising:
    image pickup means for photoelectrically converting an optical image of an image pickup object into image data, and wherein said recording and/or reproduction means stores the image data into the storage medium.

8. The recording and/or reproduction apparatus according to claim 7, further comprising:
microphone means for converting sound collected from an outside source into sound data, and
wherein said recording and/or reproduction means stores the sound data into the storage medium.

9. The recording and/or reproduction apparatus according to claim 8, wherein said recording and/or reproduction means compresses the image data and the sound data and stores the compressed image data and compressed sound data in the storage medium.

10. The recording and/or reproduction apparatus according to claim 9, wherein said recording and/or reproduction means compresses the image data in accordance with MPEG system and compresses the sound data in accordance with ATRAC system.

11. The recording and/or reproduction apparatus according to claim 7, further comprising display means for displaying image data reproduced from the storage medium by said recording and/or reproduction means.

12. The recording and/or reproduction apparatus according to claim 1, wherein said recording and/or reproduction means records and/or reproduces data onto and/or from an optical disk on which first tracks formed from a wobbled track which is wobbled on opposite side faces thereof and a non-wobbled track which is not wobbled on the opposite side faces thereof are formed from ones of lands and grooves and information is recorded on second tracks formed from the others of the lands and the grooves positioned between the wobbled track and the non-wobbled track.

13. The recording and/or reproduction apparatus according to claim 1, further comprising update control means for controlling said recording and/or reproduction means to record, when said communication means receives an update program, the update program in the storage medium.

14. The recording and/or reproduction apparatus according to claim 13, wherein said producing means stores control programs corresponding to transmission control means and said update control means, and said update control means rewrites the control programs of said producing means with the update program stored in the storage medium in response to an update instruction of a user of said recording and/or reproduction apparatus after the recording of the update program in the storage medium is completed.

15. A portable recording and/or reproduction apparatus for recording and/or reproducing data onto and/or from a storage medium, comprising:
recording and/or reproduction means for recording and/or reproducing data onto and/or from the storage medium;
communication means for communicating with an external apparatus;
discrimination means operable for discriminating a type of the external apparatus based on the transmission request information when transmission request information for requesting transmission of data is received from the external apparatus through said communication means; and
transmission control means for adaptively changing the format of data read out from the storage medium by said recording and/or reproduction means in response to a result of the discrimination by said discrimination means and controlling said communication means to transmit the data to the external apparatus,
wherein when said discrimination means discriminates that the external apparatus is a computer for universal use, said transmission control means converts a format of data read out from the storage medium into markup language format and controls said communication means to transmit the data of the markup language format to the external apparatus.

16. The recording and/or reproduction apparatus according to claim 15, wherein said discrimination means extracts an identifier representative of a type of the external apparatus from the transmission request information and discriminates the type of the external apparatus based on the extracted identifier.

17. The recording and/or reproduction apparatus according to claim 15, further comprising image pickup means for photoelectrically converting an optical image of an image pickup object into image data, and wherein said recording and/or reproduction means stores the image data in the storage medium.

18. The recording and/or reproduction apparatus according to claim 17, further comprising microphone means for converting sound collected from an outside source into sound data, and wherein said recording and/or reproduction means stores the sound data in the storage medium.

19. The recording and/or reproduction apparatus according to claim 18, wherein said recording and/or reproduction means compresses the image data and the sound data and stores the compressed image data and compressed sound data in the storage medium.

20. The recording and/or reproduction apparatus according to claim 19, wherein said recording and/or reproduction means compresses the image data in accordance with MPEG system and compresses the sound data in accordance with ATRAC system.

21. The recording and/or reproduction apparatus according to claim 17, further comprising display means for displaying image data reproduced from the storage medium by said recording and/or reproduction means.

22. The recording and/or reproduction apparatus according to claim 15, wherein said recording and/or reproduction means records and/or reproduces data in and/or from an optical disk on which first tracks formed from a wobbled track which is wobbled on opposite side faces thereof and a non-wobbled track which is not wobbled on the opposite side faces thereof are formed from ones of lands and grooves and information is recorded on second tracks formed from the others of the lands and the grooves positioned between the wobbled track and the non-wobbled track.

23. A recording and/or reproduction method for recording and/or reproducing data onto and/or from a storage medium in a portable apparatus, comprising the steps of:
producing markup language format information for an operation screen including an area for displaying data stored in said storage medium;
transmitting the markup language format information produced by the producing step to an external apparatus through communication means;
receiving, by said communication means, operation information of a user to the information for the operation screen transmitted to the external apparatus; and
performing recording and/or reproduction of the data into and/or from the storage medium in accordance with the received operation information.

24. A recording and/or reproduction method for recording and/or reproducing data onto and/or from a storage medium, comprising the steps of:
receiving transmission request information for requesting transmission of data from an external apparatus through a communication means;

discriminating a type of the external apparatus based on the received transmission request information;

adaptively changing a format of data read out from the storage medium into a markup language format in response to a result of the discriminating step indicating that the external apparatus is a computer for universal use; and transmitting the data of the markup language format to the external apparatus through said communication means.

25. A portable recording and/or reproduction apparatus for recording and/or reproducing data onto and/or from a storage medium, comprising:

recording and/or reproduction means for recording and/or reproducing data onto and/or from the storage medium;

communication means for communicating with an external apparatus;

discrimination means operable for discriminating a type of the external apparatus based on the transmission request information when transmission request information for requesting transmission of data is received from the external apparatus through said communication means; and transmission control means for adaptively changing the format of data read out from the storage medium by said recording and/or reproduction means in response to a result of the discrimination by said discrimination means and controlling said communication means to transmit the data to the external apparatus, wherein when said discrimination means discriminates that the external apparatus is another recording and/or reproduction apparatus of the same type as that of said recording and/or reproduction apparatus, said transmission control means controls said communication means to transmit image data read out from the storage medium to the external apparatus.

* * * * *